(12) United States Patent
Monden

(10) Patent No.: US 11,893,706 B2
(45) Date of Patent: Feb. 6, 2024

(54) IMAGE CORRECTION DEVICE

(71) Applicant: NEC Corporation, Tokyo (JP)

(72) Inventor: Akira Monden, Tokyo (JP)

(73) Assignee: NEC CORPORATION, Tokyo (JP)

( * ) Notice: Subject to any disclaimer, the term of this patent is extended or adjusted under 35 U.S.C. 154(b) by 192 days.

(21) Appl. No.: 17/494,937

(22) Filed: Oct. 6, 2021

(65) Prior Publication Data

US 2022/0114697 A1   Apr. 14, 2022

(30) Foreign Application Priority Data

Oct. 12, 2020 (JP) ................................. 2020-172104

(51) Int. Cl.
*G06K 9/00* (2022.01)
*G06T 3/40* (2006.01)
(Continued)

(52) U.S. Cl.
CPC .............. *G06T 3/4007* (2013.01); *G06T 5/50* (2013.01); *G06T 7/74* (2017.01);
(Continued)

(58) Field of Classification Search
CPC ........... G06T 3/4007; G06T 5/50; G06T 7/74; G06T 2207/20016; G06T 2207/20021;
(Continued)

(56) References Cited

U.S. PATENT DOCUMENTS 6,937,774 B1 * 8/2005 Specht .................. G06T 3/4061
382/254
8,761,506 B1 * 6/2014 Padwick ................ G06V 20/13
382/167

(Continued)

FOREIGN PATENT DOCUMENTS

JP    2016-110320 A    6/2016
JP       6305328 B2    4/2018

OTHER PUBLICATIONS

Extended European Search Report for EP Application No. EP21202275.0 dated Apr. 7, 2022.
(Continued)

*Primary Examiner* — Alex Kok S Liew
(74) *Attorney, Agent, or Firm* — Sughrue Mion, PLLC

(57) ABSTRACT

An image correction method includes: acquiring band images obtained by imaging a subject, and a high-resolution image having a resolution higher than that of the band images; acquiring a position difference between the object band image and the reference band image among the band images; by using a pixel of the object band image as an object pixel, for each object pixel, determining a pixel value of each sub-region obtained by dividing the imaging region of the object pixel into a plurality of regions, based on the pixel value of the object pixel and a relationship between pixel values of the pixels of the high-resolution image corresponding to the object pixel; and creating a corrected band image that holds a pixel value of light on the object band image at the pixel position of the reference band image, from the determined pixel value of each sub-region and the position difference.

15 Claims, 19 Drawing Sheets

(51) Int. Cl.
 *G06T 7/73* (2017.01)
 *G06T 5/50* (2006.01)
(52) U.S. Cl.
 CPC ........... *G06T 2207/20016* (2013.01); *G06T 2207/20021* (2013.01); *G06T 2207/20224* (2013.01)
(58) Field of Classification Search
 CPC ........ G06T 2207/20224; G06T 3/4061; G01C 11/025; H04N 9/646; H04N 1/401; H04N 1/486; H04N 1/58; H04N 23/15; H04N 25/701
 See application file for complete search history.

(56) References Cited

U.S. PATENT DOCUMENTS

2009/0251747 A1* 10/2009 Muramatsu ........ G03G 15/0194
  358/518
2012/0293669 A1* 11/2012 Mann ................. H04N 25/71
  348/207.11
2022/0222782 A1* 7/2022 Kurihara ............. H04N 1/48

OTHER PUBLICATIONS

Christoph C Borel et al: "Novel methods for panchromatic sharpening of multi/hyper-spectral image data", Geoscience and Remote Sensing Symposium,2009 IEEE International, IGARSS 2009, IEEE, Piscataway, NJ, USA, Jul. 12, 2009 (Jul. 12, 2009), pp. IV-757.

Eastman R D et al: "Image Registration for Remote Sensing, Chapter 3: Survey of Image Registration Methods", Mar. 24, 2011 (Mar. 24, 2011), Image Registration for Remote Sensing, Cambridge University Press, Cambridge [U.A.], pp. 35-76.

* cited by examiner

FIG. 4

| OBJECT BAND ID=R | |
|---|---|
| PIXEL POSITION (x, y) | POSITION DIFFERENCE (s, t) |
| (0, 0) | (0.2, 0.7) |
| (0, 1) | (0.2, 0.7) |
| ⋮ | ⋮ |
| $(x_{max}, y_{max})$ | (0.5, 0.2) |

FIG. 17

$$R'(i, j, u, v) = P(i, j, u, v) + R(i, j) - \langle P(i, j, u, v) \rangle \quad \cdots (1)$$

$$V_{RC}(x, y) = (V_R(x, y) - \overline{V_R(x, y)}) \times \frac{\sigma(V_M(x, y))}{\sigma(V_R(x, y))} \quad \cdots (2)$$

$$V_{MC}(x, y) = V_M(x, y) - \min_{i,j} V_M(i, j) \quad \cdots (3)$$

$$V_{RC}(x, y) = V_R(x, y) - \min_{i,j} V_R(i, j) \quad \cdots (4)$$

$$\begin{pmatrix} s \\ t \end{pmatrix} = A \begin{pmatrix} x \\ y \end{pmatrix} + b \quad \cdots (5)$$

IMAGE CORRECTION DEVICE

INCORPORATION BY REFERENCE

The present invention is based upon and claims the benefit of priority from Japanese patent application No. 2020-172104, filed on Oct. 12, 2020, the disclosure of which is incorporated herein in its entirety by reference.

TECHNICAL FIELD

The present invention relates to an image correction device, an image correction method, and a program.

BACKGROUND ART

As a device for acquiring images of a ground surface from an aircraft or a satellite, a pushbroom-type image acquisition device has been widely adopted. A device of this type is configured so as to acquire a line-shaped image extending in the X axis direction by using a one-dimensional array sensor as an image sensor. Then, with translation of the entire image acquisition device in the perpendicular direction (Y axis direction) with respect to the line-shaped acquired image by the movement of the aircraft or the satellite, a two-dimensional image is formed. Further, in the case of acquiring images of a plurality of wavelength bands by using an image acquisition device of this type, the device is configured to image a subject with a plurality of filters, in each of which the band that is a wavelength band of light to be transmitted is different, attached to each of the one-dimensional array sensors. An image of each wavelength band is called a band image.

For example, Patent Literature 1 discloses a technology of reducing a color shift caused in an image acquisition device of this type, by means of a combination of band image shifting corresponding to the position shift quantity and general interpolation processing such as a linear interpolation method.

Patent Literature 1: JP 6305328 B

When distortion is caused by the characteristics of the optical system, a phase difference is generated between bands, and a color shift may be caused by the phase difference. A color shift caused by a phase difference in this context means that in the case of imaging the same subject by a plurality of bands such as RGB (red, green, blue) for example, the color of the same portion of the subject may be different from that of the subject depending on the position of the portion in the pixel of each band. Such a color shift caused by a phase shift is difficult to be reduced by a combination of band image shifting corresponding to the position shift quantity and general interpolation processing such as a linear interpolation method at the time of correcting the color shift.

SUMMARY

An exemplary object of the present invention is to provide an image correction device that solves the above-described problem, that is, a problem that it is difficult to reduce a color shift, caused by a phase shift, by means of a combination of band image shifting and general interpolation processing such as a linear interpolation method.

An image correction device, according to one aspect of the present invention, is configured to include
a band image acquisition means for acquiring a plurality of band images obtained by imaging a subject;
a high-resolution image acquisition means for acquiring a high-resolution image obtained by imaging the subject, the high-resolution image having a resolution that is higher than a resolution of the band images;
a position difference acquisition means for, by using at least one of the band images as a reference band image and at least one of the rest of the band images as an object band image, acquiring a position difference between the object band image and the reference band image;
a corrected band image creation means for, by using a pixel of the object band image as an object pixel, for each object pixel, determining a pixel value of each of sub regions obtained by dividing the imaging region of the object pixel into a plurality of regions, on the basis of a pixel value of the object pixel and a relationship between pixel values of a plurality of pixels of the high-resolution image corresponding to the object pixel, and creating a corrected band image that holds a pixel value of light on the object band image at a pixel position of the reference band image from the determined pixel value of each of the sub regions and the position difference; and
a corrected band image output means for outputting the corrected band image.

Further, an image correction method, according to another aspect of the present invention, is configured to include
acquiring a plurality of band images obtained by imaging a subject;
acquiring a high-resolution image obtained by imaging the subject, the high-resolution image having a resolution that is higher than a resolution of the band images;
by using at least one of the band images as a reference band image and at least one of the rest of the band images as an object band image, acquiring a position difference between the object band image and the reference band image;
by using a pixel of the object band image as an object pixel, for each object pixel, determining a pixel value of each of sub regions obtained by dividing the imaging region of the object pixel into a plurality of regions, on the basis of a pixel value of the object pixel and a relationship between pixel values of a plurality of pixels of the high-resolution image corresponding to the object pixel, and creating a corrected band image that holds a pixel value of light on the object band image at a pixel position of the reference band image from the determined pixel value of each of the sub regions and the position difference; and
outputting the corrected band image.

Further, a program, according to another aspect of the present invention, is configured to cause a computer to perform processing of:
acquiring a plurality of band images obtained by imaging a subject;
acquiring a high-resolution image obtained by imaging the subject, the high-resolution image having a resolution that is higher than a resolution of the band images;
by using at least one of the band images as a reference band image and at least one of the rest of the band images as an object band image, acquiring a position difference between the object band image and the reference band image;
by using a pixel of the object band image as an object pixel, for each object pixel, determining a pixel value of each of sub regions obtained by dividing the imaging region of the object pixel into a plurality of regions, on the basis of a pixel value of the object pixel and a relationship between pixel values of a plurality of pixels of the high-resolution image corresponding to the object pixel, and creating a corrected band image that holds a pixel value of light on the object band image at a pixel position of the reference band image from the determined pixel value of each of the sub regions and the position difference; and outputting the corrected band image.

With the configurations described above, the present invention enables reduction of a color shift caused by a phase shift.

BRIEF DESCRIPTION OF DRAWINGS

FIG. 4 is a table illustrating an exemplary configuration of position difference information of an R-band image.

FIG. 17 illustrates mathematical expressions to be used in the image correction device according to the first exemplary embodiment of the present invention.

EXEMPLARY EMBODIMENTS

Next, exemplary embodiments of the present invention will be described in detail with reference to the drawings.

First Exemplary Embodiment

Figure 1:
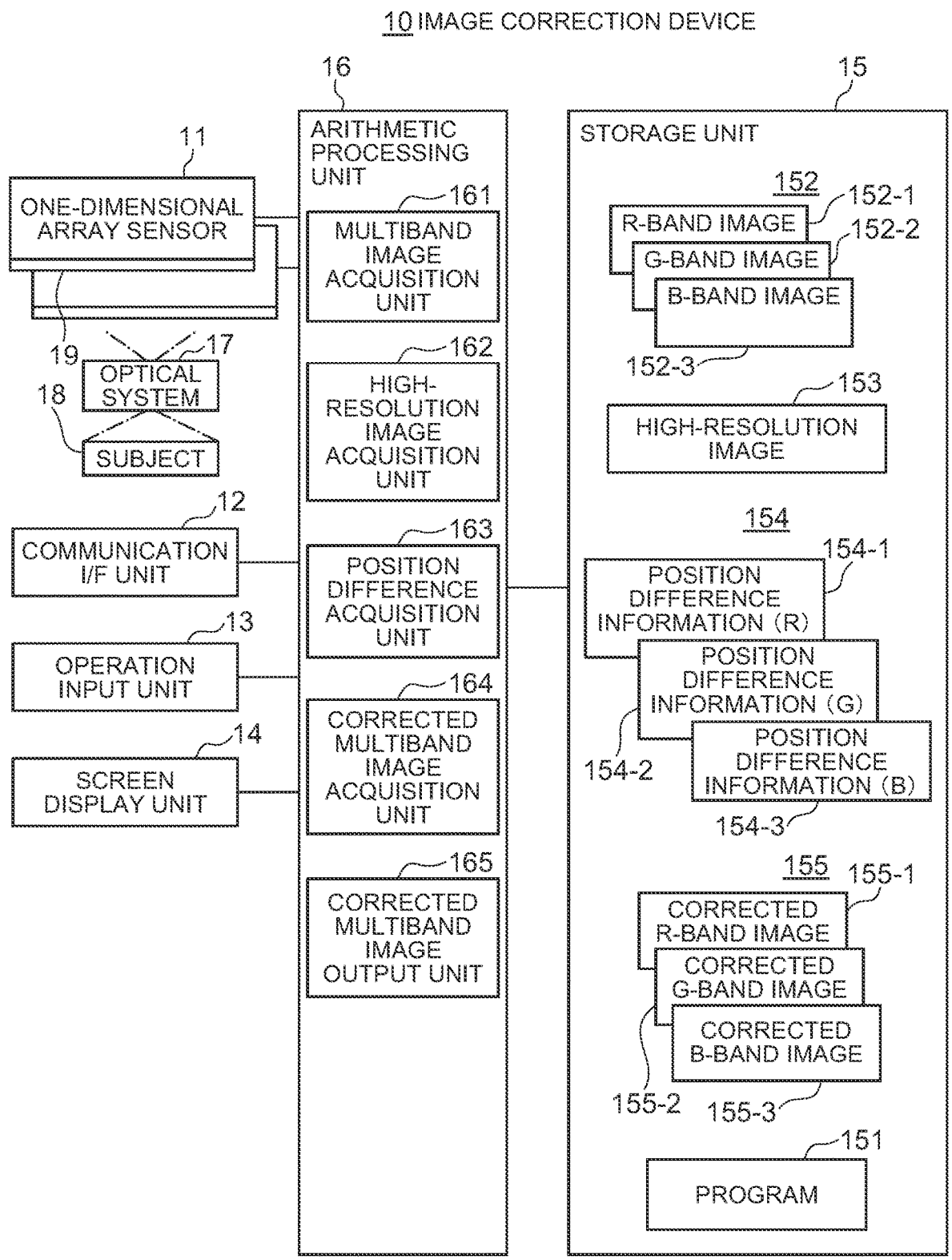
FIG. 1 is a block diagram illustrating an image correction device according to a first exemplary embodiment of the present invention.

Referring to FIG. 1, an image correction device 10 according to a first exemplary embodiment of the present invention includes a plurality of one-dimensional array sensors 11, a communication interface (I/F) unit 12, an operation input unit 13, a screen display unit 14, a storage unit 15, and an arithmetic processing unit 16.

The one-dimensional array sensors 11 include, for example, a one-dimensional charge-coupled device (CCD) sensor, a one-dimensional complementary MOS (CMOS) sensor, or the like, and constitute a pushbroom-type image acquisition device that images a subject 18. The one-dimensional array sensors 11 are provided with a plurality of filters 19 whose bands that are wavelength bands of light to be transmitted are different. The number of band images and the wavelength bands are determined according to the combinations and the number of sets of the one-dimensional array sensors 11 and the filters 19 to be used. For example, in a multiband sensor mounted on ASNARO-1 that is a high-resolution optical satellite, the following six band images are acquired:

Band 1: wavelength band 400-450 nm (Ocean Blue)
Band 2: wavelength band 450-520 nm (Blue)
Band 3: wavelength band 520-600 nm (Green)
Band 4: wavelength band 630-690 nm (Red)
Band 5: wavelength band 705-745 nm (Red Edge)
Band 6: wavelength band 760-860 nm (NIR)

Further, ASNARO-1 is equipped with a panchromatic sensor that acquires a panchromatic image that is a black and white image having a higher resolution than that of a multiband image. A panchromatic image is a single band image having a wavelength of 450 nm to 860 nm.

The communication IN unit 12 is configured of, for example, a dedicated data communication circuit, and is configured to perform data communication with various devices connected via wired or wireless communication. The operation input unit 13 includes operation input devices such as a keyboard and a mouse, and is configured to detect an operation by an operator and output it to the arithmetic processing unit 16. The screen display unit 14 includes a screen display device such as a liquid crystal display (LCD) or a plasma display panel (PDP), and is configured to display, on the screen, a corrected band image and the like in accordance with an instruction from the arithmetic processing unit 16.

The storage unit 15 includes storage devices such as a hard disk and a memory, and is configured to store processing information and a program 151 necessary for various types of processing to be performed in the arithmetic processing unit 16. The program 151 is a program that is read and executed by the arithmetic processing unit 16 to thereby realize various processing units. The program 151 is read, in advance, from an external device (not illustrated) or a storage medium (not illustrated) via a data input and output function such as the communication IN unit 12, and is stored in the storage unit 15.

The main processing information to be stored in the storage unit 15 includes a multiband image 152, a high-resolution image 153, position difference information 154, and a corrected multiband image 155.

The multiband image 152 is a set of a plurality of band images acquired by a pushbroom-type image acquisition device. The multiband image 152 may be a set of all band images acquired by a pushbroom-type image acquisition device, or a set of some band images. In the present embodiment, the multiband image 152 is assumed to be configured of three bands namely an R-band image 152-1, a G-band image 152-2, and a B-band image 152-3. For example, in the case of ASNARO-1 mentioned above, a band 4 may be assigned as the R-band image 152-1, a band 3 may be assigned as the G-band image 152-2, and a band 2 may be assigned as the B-band image 152-3, respectively.

The high-resolution image 153 is an image that is acquired by a pushbroom-type image acquisition device and has a higher resolution than that of the multiband image 152. For example, in the case of ASNARO-1 described above, a panchromatic image may be used as the high-resolution image 153.

In the case where each of the band images constituting the multiband image 152 is an object band image and one of the band images is a reference band image, the position difference information 154 is information about the position difference between the reference band image and an object band image. In the present embodiment, the G-band image 152-2 is used as a reference band image. Therefore, the position difference information 154 is configured of position difference information 154-1 in which the position difference of the R-band image 152-1 relative to the G-band image 152-2 is recorded, position difference information 154-2 in which the position difference of the G-band image 152-2 relative to the G-band image 152-2 is recorded, and position difference information 154-3 in which the position difference of the B-band image 152-3 relative to the G-band image 152-2 is recorded.

Figure 2:
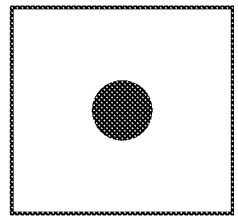
FIG. 2 is a schematic diagram for explaining a phenomenon in which the same portion of a subject is imaged at a different position in a pixel of each band in a pushbroom-type image acquisition device.
Figure 2:
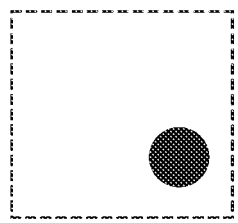
Figure 3:
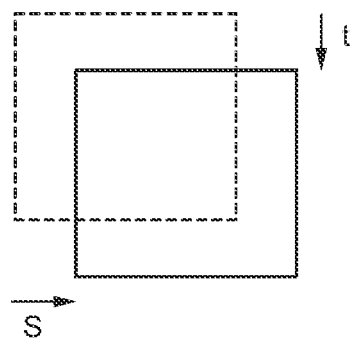
FIG. 3 is a diagram for explaining a position difference between pixels of an object band image.

In the case where distortion is caused by the characteristics or the like of the optical system in the pushbroom-type image acquisition device, when the subject 18 is imaged, a phenomenon that the same portion of the subject 18 is imaged at different locations in pixels of the respective bands occurs. FIG. 2 is a schematic diagram for explaining such a phenomenon. In FIG. 2, a solid-line rectangle shows an imaging range of a pixel (x, y) of the reference band image, a broken-line rectangle shows an imaging range of a pixel (x, y) of an object band image, and a black circle represents a part of the subject 18. In the example of FIG. 2, the black circle that is a part of the subject 18 is located at almost the center in the pixel (x, y) of the reference band, while it is located at the lower right in the pixel (x, y) of the object band. In this case, as illustrated in FIG. 3, when the pixel (x, y) of the object band is moved rightward on the sheet by s pixels (0≤s<1) and moved downward on the sheet by t pixels (0≤s<1), respectively, the imaging ranges of the pixel (x, y) of the reference band image and the pixel (x, y) of the object band image match. When the imaging ranges of a plurality of band images match in as described above, it is called that pixel boundaries of the band images match. Further, (s, t) at that time is referred to as a position difference. The position difference may differ in each object band and in each pixel. In the present embodiment, the position difference information 154 is recorded for each object band and for each pixel. Note that in the present embodiment, the G-band image is a reference band and also an object band. Therefore, the position difference of each pixel of the G-band image is zero.

FIG. 4 is a table illustrating an exemplary configuration of the position difference information 154-1 of the R-band image 152-1. The position difference information 154-1 of this example is configured of items of the object band ID and information of each pixel. In the item of object band ID, identification information for uniquely identifying the object band ID is stored. The item of information of each pixel is configured of a combination of an item of a pixel position of the object band image and an item of position difference in that pixel position. In the item of pixel position, xy coordinate values (x, y) specifying the position of the pixel on the object band image is stored. In the item of position difference, (s, t) described with reference to FIG. 3 is stored. Although not illustrated, the position difference information 154-2 of the B-band image 152-3 also has a configuration similar to that of the position difference information 154-1.

The corrected multiband image 155 is a multiband image obtained by applying correction to the multiband image 152 so as not to cause a color shift. The corrected multiband image 155 is configured of a corrected R-band image 155-1, a corrected G-band image 155-2, and a corrected B-band image 155-3.

The arithmetic processing unit 16 has a microprocessor such as an MPU and the peripheral circuits thereof, and is configured to read, from the storage unit 15, and execute the program 151 to allow the hardware and the program 151 to cooperate with each other to thereby realize the various processing units. The main processing units realized by the arithmetic processing unit 16 include a multiband image acquisition unit 161, a high-resolution image acquisition unit 162, a position difference acquisition unit 163, a corrected multiband image creation unit 164, and a corrected multiband image output unit 165.

The multiband image acquisition unit 161 is configured to acquire the multiband image 152 from the pushbroom-type image acquisition device configured of the one-dimensional array sensors 11, and store it in the storage unit 15. Further, the high-resolution image acquisition unit 162 is configured to acquire the high-resolution image 153 from the image acquisition device, and stores it in the storage unit 15. However, the multiband image acquisition unit 161 and the high-resolution image acquisition unit 162 are not limited to have the configuration of acquiring the multiband image 152 and the high-resolution image 153 from the image acquisition device. For example, when the multiband image 152 and the high-resolution image 153 acquired from the image acquisition device are accumulated in an image server device not illustrated, the multiband image acquisition unit 161 and the high-resolution image acquisition unit 162 may be configured to acquire the multiband image 152 and the high-resolution image 153 from the image server device.

The position difference acquisition unit 163 is configured to acquire the position difference information 154 of the multiband image 152 acquired by the multiband image acquisition unit 161, and store it in the storage unit 15.

The corrected multiband image creation unit 164 is configured to read the multiband image 152, the high-resolution image 153, and the position difference information 154 from the storage unit 15, create the corrected multiband image 155 therefrom, and store it in the storage unit 15.

The corrected multiband image output unit 165 is configured to read the corrected multiband image 155 from the storage unit 15, display the corrected multiband image 155 on the screen display unit 14, on/and output it to an external device via the communication I/F unit 12. The corrected multiband image output unit 165 may down-sampling each of the corrected R-band image 155-1, the corrected G-band image 155-2, and the corrected B-band image 155-3 constituting the corrected multiband image 155 as required, and display and output it singly. Alternatively, the corrected multiband image output unit 165 may display a color image obtained by synthesizing the corrected R-band image 155-1, the corrected G-band image 155-2, and the corrected B-band image 155-3 on the screen display unit 14, or/and output it to an external device via the communication I/F unit 12. Alternatively, the corrected multiband image output unit 165 may generate a pansharpened image by superimposing the corrected multiband image 155 and the high-resolution image 153, and display and output the pansharpened image.

Figure 5:
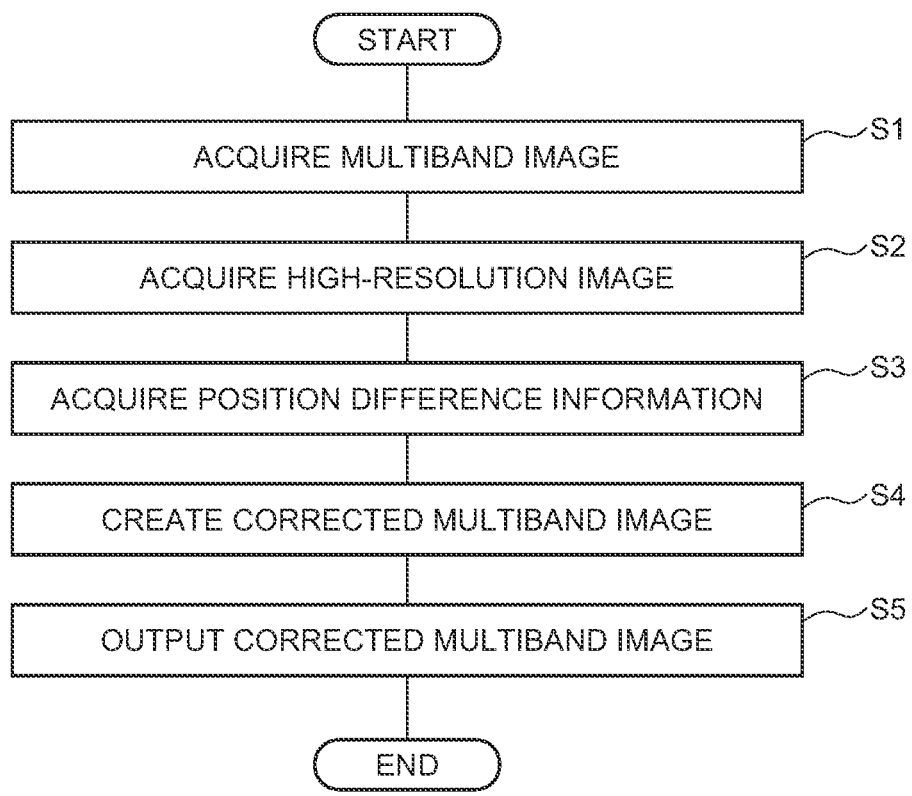
FIG. 5 is a flowchart of an exemplary operation of the image correction device according to the first exemplary embodiment of the present invention.

FIG. 5 is a flowchart of an exemplary operation of the image correction device 10 according to the present embodiment. Referring to FIG. 5, first, the multiband image acquisition unit 161 acquires the multiband image 152 imaged by the image acquisition device configured of the one-dimensional array sensors 11, and stores it in the storage unit 15 (step S1). Then, the high-resolution image acquisition unit 162 acquires the high-resolution image 153 imaged by the image acquisition device, and stores it in the storage unit 15 (step S2). Then, the position difference acquisition unit 163 acquires the position difference information 154 of the multiband image 152 acquired by the multiband image acquisition unit 161, and stores it in the storage unit 15 (step S3). Then, the corrected multiband image creation unit 164 reads the multiband image 152, the high-resolution image 153, and the position difference information 154 from the storage unit 15, creates the corrected multiband image 155 on the basis thereof, and stores it in the storage unit 15 (step S4). Then, the corrected multiband image output unit 165 reads the corrected multiband image 155 from the storage unit 15, displays it on the screen display unit 14, or/and outputs it to an external device via the communication I/F unit 12 (step S5).

Next, main constituent elements of the image correction device 10 will be described in detail. First, the position difference acquisition unit 163 will be described in detail.

Figure 6:
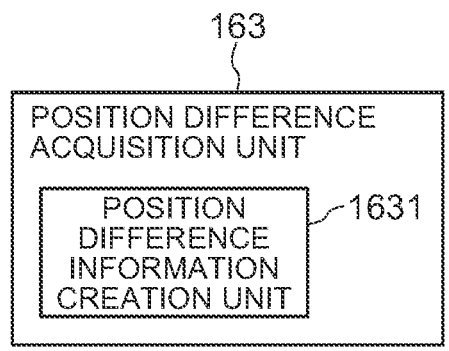
FIG. 6 is a block diagram illustrating an example of a position difference acquisition unit in the image correction device according to the first exemplary embodiment of the present invention.

FIG. 6 is a block diagram illustrating an example of the position difference acquisition unit 163. The position difference acquisition unit 163 of this example is configured to include a position difference information creation unit 1631.

The position difference information creation unit 1631 is configured to read the multiband image 152 from the storage unit 15, create the position difference information 154-1 of the R band from the G-band image 152-2 and the R-band image 152-1, and create the position difference information 154-3 of the B band from the G-band image 152-2 and the B-band image 152-3. The position difference information creation unit 1631 creates the position difference information 154-2 of the G-band image 152-2 such that the position difference of each pixel is (0, 0).

Figure 7:
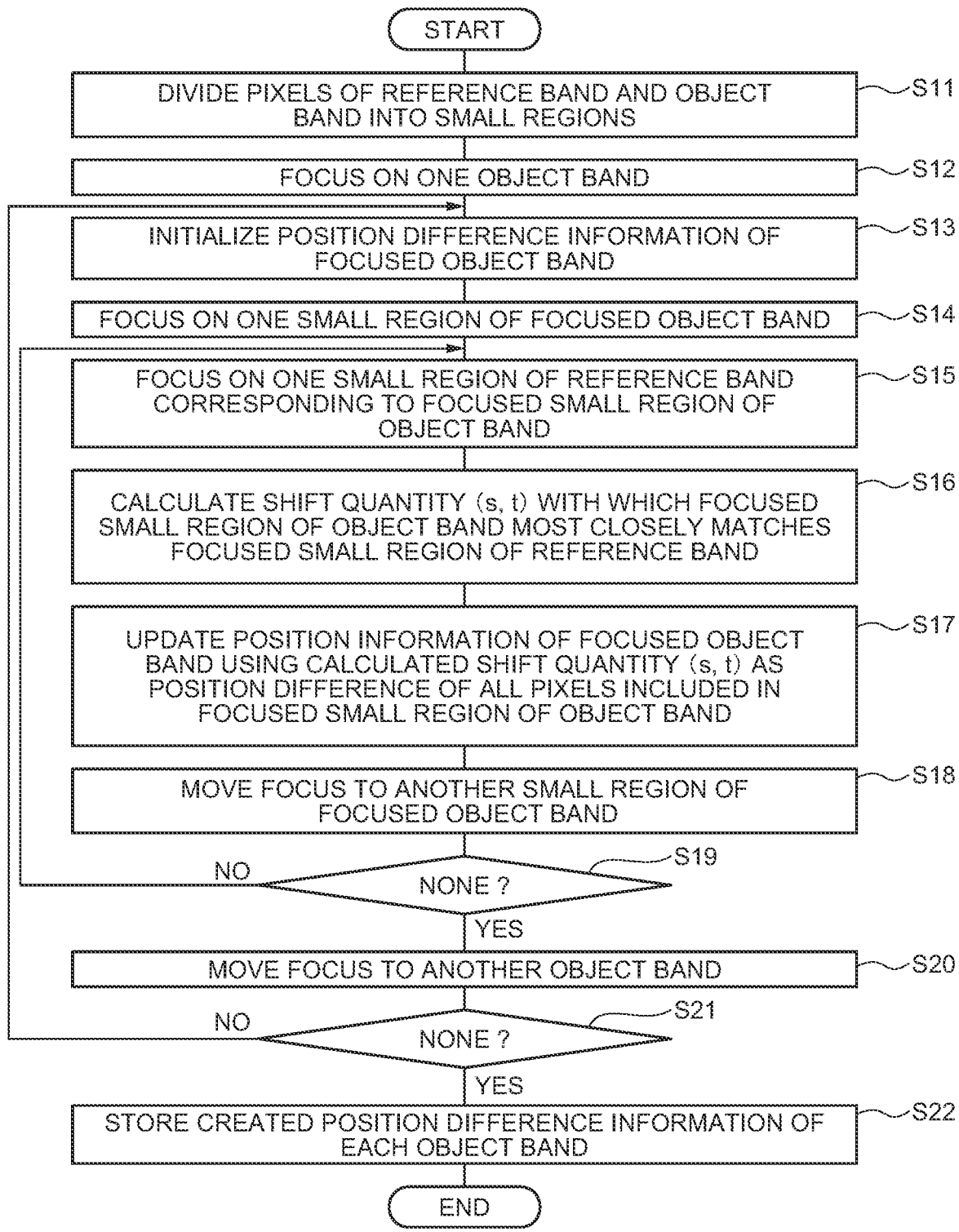
FIG. 7 is a flowchart illustrating an example of processing by a position difference information creation unit in the image correction device according to the first exemplary embodiment of the present invention.
Figure 8:
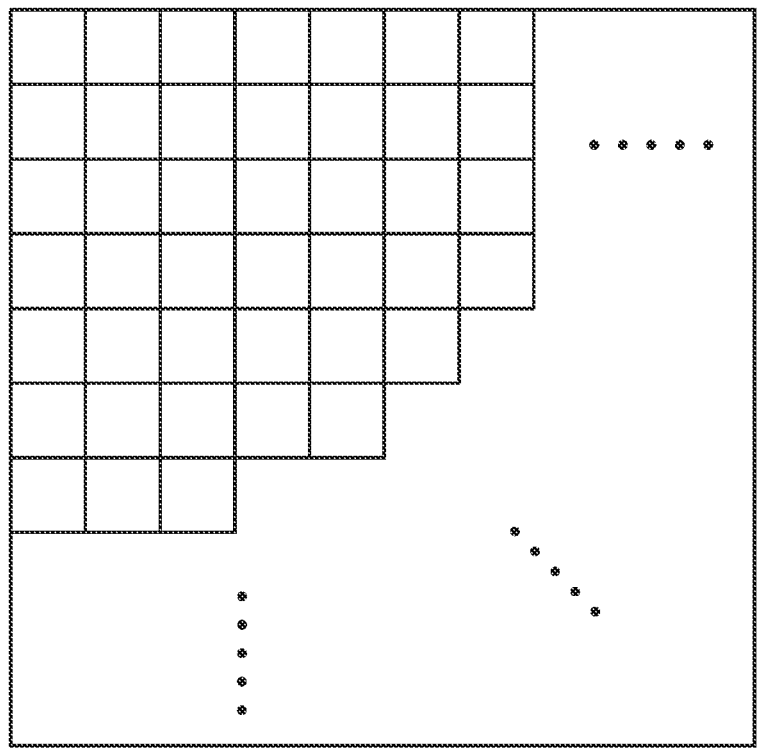
FIG. 8 illustrates an example that the position difference information creation unit of the image correction device according to the first exemplary embodiment divides each image of a reference band and an object band into small regions.

FIG. 7 is a flowchart illustrating exemplary processing by the position difference information creation unit 1631. First, the position difference information creation unit 1641 divides respective images of the reference band and the object bands into a plurality of small regions each having a predetermined shape and size, as illustrated in FIG. 8, for example (step S11). In FIG. 8, the small region is a rectangle, but it may be in a shape other than rectangle. It is desirable that the size of a small region is sufficiently larger than one pixel.

Then, the position difference information creation unit 1631 focuses on one of the object bands (for example, R band) (step S12). Then, the position difference information creation unit 1631 initializes the position difference information of the focused object band (step S13). For example, when the position difference information of the object band has a format illustrated in FIG. 4, the position difference (s, t) at each pixel position (x, y) is initialized to a NULL value, for example.

Then, the position difference information creation unit 1631 focuses on one small region of the focused object band (step S14). Then, the position difference information creation unit 1631 focuses on one small region of the reference band corresponding to the focused small region of the object band (step S15). In the present embodiment, it is assumed that the position difference of the object band is one pixel or smaller. Therefore, the one small region of the reference band corresponding to the focused small region of the object band is a small region located at the same position as that of the small region of the object band. That is, when the small region of the focused object band is a small region at the upper left corner in FIG. 8, the focused small region in the reference band is also a small region at the upper left corner in FIG. 8.

Then, the position difference information creation unit 1631 calculates the shift quantity (s, t) in which the focused small region of the object band most closely matches the focused small region of the reference band (step S16). For example, in the case where the focused small region of the object band most closely matches the focused small region of the reference band when it is shifted by 0.2 pixels in the X axis direction and 0.7 pixels in the Y axis direction for example, the X-axial shift quantity s=0.2 pixels and the Y-axial shift quantity t=0.7 pixels are the obtained shift quantity. Such shift quantity may be calculated by using a subpixel matching method that enables calculation of shift quantity with the accuracy of less than 1 pixel, such as a phase limiting correlation method or an SSD parabola fitting method. Then, the position difference information creation unit 1631 updates the position difference information of the focused object band by using the calculated shift quantity (s, t) as the position difference of every pixel included in the focused small region of the object band (step S17). Note that the position difference may be a real number or an integer.

Then, the position difference information creation unit 1631 moves the focus to another small region of the focused object band (step S18), and returns to the processing of step S15 to execute the processing similar to that described above on the newly focused small region of the object band. Then, upon completion of focusing on all small regions in the focused object band (YES at step S19), the position difference information creation unit 1631 moves the focus to one of the other object bands (for example, B band) (step S20), and returns to the processing of step S13 to execute the processing similar to that of the processing described above on the newly focused object band. Then, upon completion of focusing on all object bands (that is, R and B bands) (YES at step S21), the position difference information creation unit 1631 stores the created position difference information of the respective object bands in the storage unit 15 (step S22). Then, the position difference information creation unit 1631 ends the processing illustrated in FIG. 7.

Figure 9:
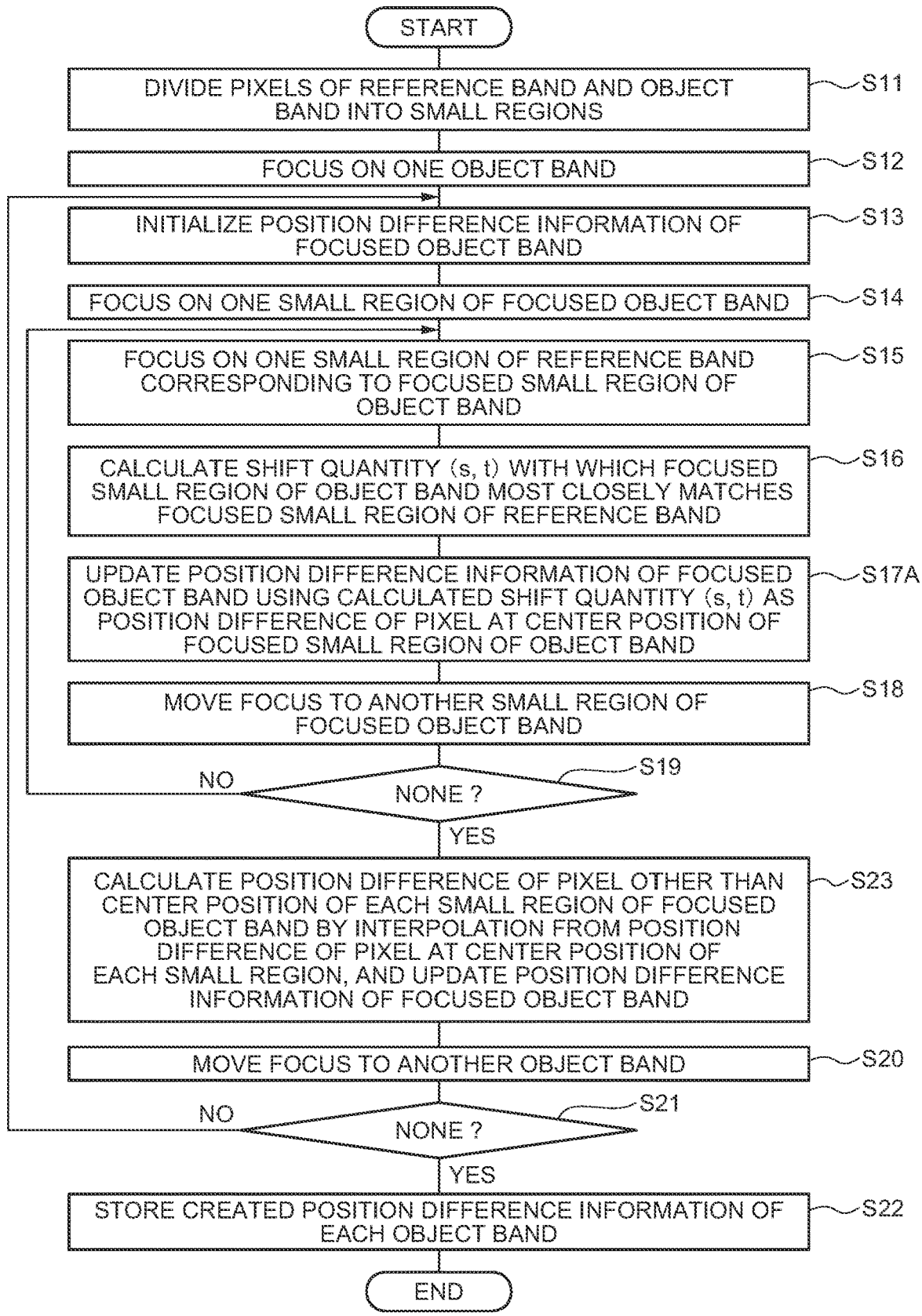
FIG. 9 is a flowchart illustrating another example of processing by the position difference information creation unit in the image correction device according to the first exemplary embodiment of the present invention.

FIG. 9 is a flowchart illustrating another example of processing by the position difference information creation unit 1631. The processing illustrated in FIG. 9 differs from the processing illustrated in FIG. 7 in that step S17 is replaced with step S17A and that new step S23 is provided between step S19 and step S20. The rest are the same as those illustrated in FIG. 7. At step S17A of FIG. 9, the position difference information creation unit 1631 updates the position difference information of the focused object band by using the shift quantity (s, t) calculated at step S16 as a position difference of the pixel at the center position in the focused small region of the object band. Therefore, at step S17A of FIG. 9, the position difference of the pixels other than the pixel at the center position in the focused small region is not updated, and the NULL value that is the initial value remains. At step S23 of FIG. 9, the position difference information creation unit 1631 calculates the position difference of the pixels other than the pixel at the center position in each small region of the focused object band, by interpolation from the position difference of the pixel at the center position in each small region calculated at step 17A, and updates the position difference information of the focused object band. The interpolation method may be interpolation by a weighted average according to the distance from the center of an adjacent small region, for example.

When the shift quantity calculated for each small region is used as the position difference of all pixels in the small region as illustrated in FIG. 7, the position difference may not continue at the boundary of small regions. Meanwhile, in the method illustrated in FIG. 9, position difference changes continuously according to the pixel positions, which can prevent discontinuous position difference. Consequently, the method illustrated in FIG. 9 has an effect of preventing generation of a level difference in the color of the corrected image at the boundary of small regions.

Figure 10:
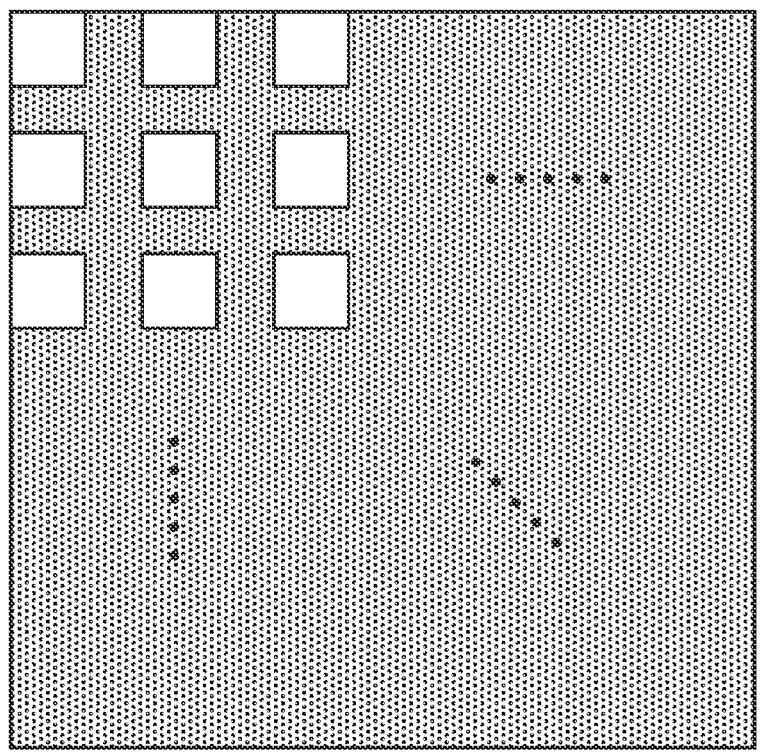
FIG. 10 illustrates an example that the position difference information creation unit of the image correction device according to the first exemplary embodiment divides each image of a reference band and an object band into small regions such that a gap is formed between the small regions.

Further, in the method illustrated in FIGS. 7 and 9, the entire images of the reference band and the object band are thoroughly divided into small regions. However, as illustrated in FIG. 10, the position difference information creation unit 1631 may divide them such that there is a gap (hatched portion in the figure) between small regions. Then, the position difference information creation unit 1631 may obtain the position difference of a pixel included in the gap by interpolation from the position difference of the pixel at the center position calculated at step S17 or S17A. The interpolation in that case may be interpolation by a weighted average according to the distance from the center of the adjacent small region, for example. According to the method of creating the position difference by dividing the reference band and the object band into small regions so as to have a gap between small regions as described above, the calculation time can be reduced compared with the case of dividing them so as to not to have any gap.

In the method illustrated in FIGS. 7 and 9, the position difference information creation unit 1631 creates the position difference of each pixel of the object band image from the multiband image 152. However, the position difference information creation unit 1631 may create the position difference of each pixel of the object band image from the position and posture information of the platform (artificial satellite or aircraft) that acquires the multiband image. In general, an image captured from an artificial satellite or an aircraft is projected to a map by using the position, posture, and the like of the platform at the time of acquiring the image to thereby be processed into an image product. In the case of a multispectral image, since it is projected to a map by each band, position difference information is also obtained in the process of map projection. Therefore, the position difference information creation unit 1631 may create the position difference information of each pixel of the object band image by using a general map projection method.

Figure 11:
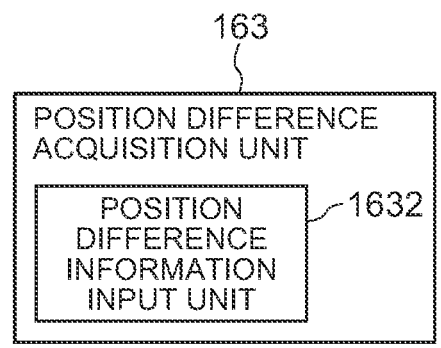
FIG. 11 is a block diagram illustrating another example of a position difference acquisition unit in the image correction device according to the first exemplary embodiment of the present invention.

FIG. 11 is a block diagram illustrating another example of the position difference acquisition unit 163. The position difference acquisition unit 163 of this example is configured to include a position difference information input unit 1632.

The position difference information input unit 1632 is configured to input the position difference information 154 therein from an external device not illustrated via the communication I/F unit 12, and store it in the storage unit 15. Alternatively, the position difference information input unit 1632 is configured to input therein the position difference information 154 from an operator of the image correction device 10 via the operation input unit 13, and store it in the storage unit 15. That is, the position difference information input unit 1632 is configured to input therein the position difference information 154 calculated by a device other than the image correction device 10, and store it in the storage unit 15.

As described above, the position difference acquisition unit 163 is configured to create by itself the position difference information 154 of the multiband image 152, or input it therein from the outside, and store it in the storage unit 15.

Next, the corrected multiband image creation unit 164 will be described in detail.

Figure 12:
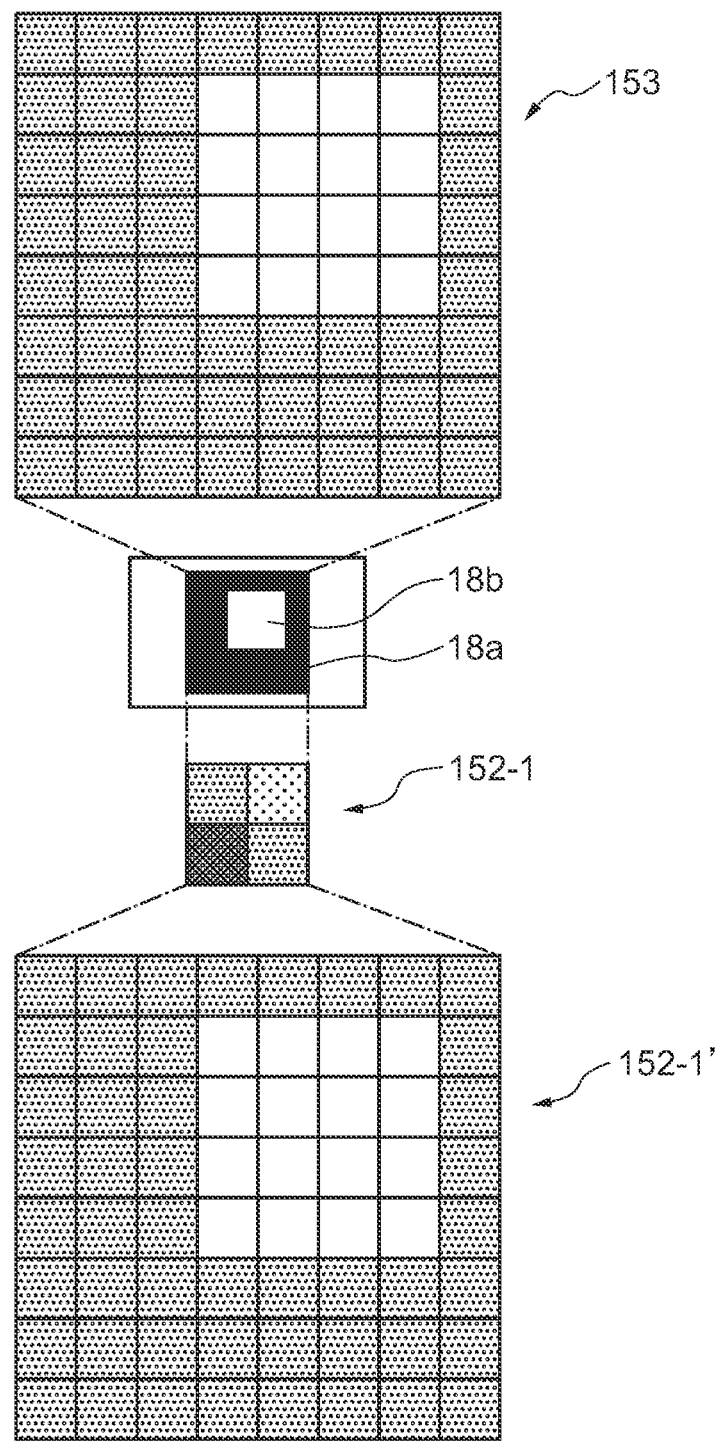
FIG. 12 is schematic diagram for explaining the principle that a corrected multiband image creation unit in the image correction device according to the first exemplary embodiment of the present invention creates a corrected multiband image from a multiband image, a high-resolution image, and position difference information.

FIG. 12 is schematic diagram for explaining the principle that the corrected multiband image creation unit 164 creates a corrected multiband image from a multiband image, a high-resolution image, and position difference information. Here, as illustrated in FIG. 12, a subject 18 in which a smaller whiteboard 18b overlaps a blackboard 18a is considered. In FIG. 12, a reference numeral 152-1 denotes an R-band image obtained by imaging the subject 18 and is configured of 2×2=4 pieces of pixels. Meanwhile, in FIG. 12, a reference numeral 153 denotes a high-resolution image obtained by imaging the subject 18 and is configured of 8×8=64 pieces of pixels. That is, there are the R-band image 152-1 and the high-resolution image 153 in which the same subject 18 is imaged. Each of the four pixels of the R-band image 152-1 shows part of the blackboard 18a and part of the whiteboard 18b in its imaging range. Therefore, assuming that a maximum value of the pixel value of a pixel of the R-band image is 256, the pixel value of the four pixels of the R-band image 152-1 is an intermediate pixel value corresponding to the ratio of the blackboard and the whiteboard included in the imaging range. On the other hand, in the high-resolution image 153, there is a pixel showing only the blackboard 18a and a pixel showing only the whiteboard 18b in the imaging range. Therefore, the pixel value of a pixel of the high-resolution image 153 showing only the blackboard 18a is zero, while the pixel value of a pixel of the high-resolution image 153 showing only the whiteboard 18b is 256. As described above, distribution of luminance values and brightness within the imaging range of pixels of the R-band image 152-1 in which the blackboard 18a and the whiteboard 18b are included in the imaging range can be estimated from the pixel values of 4×4=16 pieces of pixels of the high-resolution image 153 corresponding to the one pixel of the R-band image 152-1.

That is, the luminance values and the brightness have a strong correlation between the multiband image and the high-resolution image, that is, between the bands. Therefore, assuming that each of the four pixels of the R-band image is configured of 4×4=16 pieces of pixels that is similar to the high-resolution image as denoted by 152-1' in FIG. 12, it is considered that the relationship between the pixel values of the pixels of the 16 pieces of pixels becomes the same as the relationship between the pixel values of the pixels of the 16 pieces of pixels of the corresponding high-resolution image 153. The present invention focuses on such a point, and determines a pixel value of a plurality of sub regions obtained by vertically and horizontally dividing the imaging region of one pixel of the multiband image into a plurality of pieces, on the basis of the pixel value of such a pixel and a relationship between the pixel values of a plurality of pixels of the high-resolution image corresponding to such a pixel.

Then, by shifting the pixel of the object band image by the position difference, the present invention determines the pixel position of the reference band image, and determines the total sum of the pixel values of a plurality of sub regions on the object band image included in the determined pixel position to be a pixel value of light on the object band at the pixel position.

An example of a relationship between pixel values of pixels that can be used in the present invention is a ratio of pixel values. Instead of a ratio of pixel values, a difference between pixel values can also be used. The ratio of pixel values between pixels is the same between the object band image and the high-resolution image means that, in the case of four pixels as an example, m1:m2:m3:m4=r1:r2:r3:r4 is established, where m1 to m4 represent pixel values of the four pixels of the object band image and r1 to r4 represent pixel values of the four pixels of the high-resolution image. Further, a difference between pixels of a plurality of pixels is the same between the object band image and the high-resolution image means that pixel values of the four pixels of the object band image are expressed as gg+r1-av, gg+r2-av, gg+r3-av, and gg+r4-av, where av represents an average of pixel values of the four pixels of the high-resolution image, and gg represents the value of the original pixel.

As a relationship between pixel values, whether to use a ratio of the pixel values or use a difference between the pixel values may be determined arbitrarily. For example, in the environment where a condition that the brightness ratio is the same between the corresponding pixels of the multiband image and the high-resolution image is established, the ratio of pixel values may be used. That is, in order to enable comparison of the brightness ratio, if the pixel value 0 serving as the reference is in a state of not applied with light so that it is in an environment where a pixel value is determined in comparison with the brightness entering each band, the ratio of pixel values may be used. However, in an image obtained by capturing the ground from an artificial satellite in particular, not only light reflected at the ground surface that is a desirable signal but also light scattered in the atmosphere also enters the sensor. Therefore, the pixel value becomes larger by the light scattered in the atmosphere. In the light scattered in the atmosphere, since a shorter wavelength has a larger value, how the pixel value becomes larger differs according to the band. Therefore, in an image capturing the ground from an artificial satellite, the ratio of pixel values may not show the brightness ratio. Accordingly, in such an environment, it is preferable to use a difference between pixel values as the relationship between the pixel values. This is because the difference between pixel values is not changed even if a certain quantity of pixel value of each band is added. By using the difference between pixel values, with respect to an image of the ground captured from an artificial satellite, it is possible to remove the effect of adding the output by the light scattered in the atmosphere or the like. Therefore, by using the difference between pixel values, even if the ratio of pixel values does not show the brightness ratio, it is possible to create a corrected image with no color shift.

The example of processing the multiband image with the precise of ¼ pixel has been described above. It is also possible to enlarge the multiband image and the high-resolution image by interpolation to thereby perform processing with the precise of ¼ pixel or higher (for example, ⅛ pixel). Hereinafter, a specific example by the corrected multiband image creation unit 164 will be described in detail.

Figure 13:
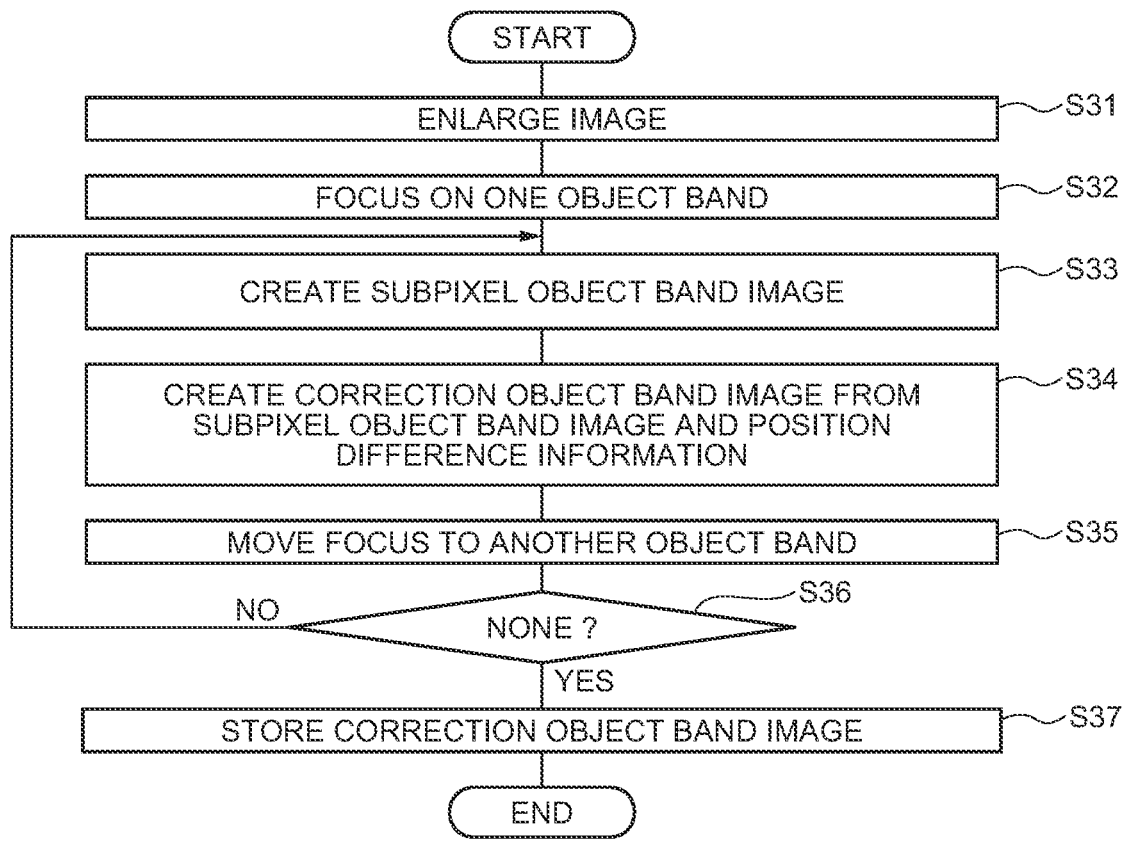
FIG. 13 is a flowchart illustrating an example of processing by the corrected multiband image creation unit in the image correction device according to the first exemplary embodiment of the present invention.

FIG. 13 is a flowchart illustrating exemplary processing by the corrected multiband image creation unit 164. Referring to FIG. 13, the corrected multiband image creation unit 164 first enlarges each band image constituting the multiband image 152 so as to have the same resolution as that of the high-resolution image 153 (step S31). For example, when the resolution of the multiband image 152 is ¼ of that of the high-resolution image 153, the corrected multiband image creation unit 164 enlarges the multiband image 152 by four times. Alternatively, the corrected multiband image creation unit 164 may enlarge the multiband image 152 by eight times, and enlarge the high-resolution image 153 by two times. In this way, both the multiband image and the high-resolution image may be enlarged if the resolution of the multiband image and that of the high-resolution image become the same. Enlargement of an image is performed using interpolation such as bilinear interpolation or bicubic interpolation, for example. In this example, it is assumed that the multiband image 152 is enlarged by eight times and the high-resolution image 153 is enlarged by two times by interpolation so as to allow the multiband image 152 to be processed with precision of ⅛ pixel. Hereinafter, a multiband image and a high-resolution image after the enlargement may be referred to as an enlarged multiband image and an enlarged high-resolution image.

Then, the corrected multiband image creation unit 164 focuses on one of the object bands (for example, R band) (step S32). Then, the corrected multiband image creation unit 164 uses an enlarged object band image and an enlarged high-resolution image to create an image (referred to as a subpixel object band image) in which the pixel value of each pixel of the focused object band image is allocated to each sub region when each pixel is divided into a plurality of sub regions (step S33). Then, the corrected multiband image creation unit 164 uses position difference information of the created subpixel object band image and the object band to create a correction object band image (step S34). Then, the corrected multiband image creation unit 164 moves the focus to another object band (step S35), returns to step S33 through step S36 to repeat the processing similar to the processing described above. Then, upon completion of creating a correction object band image for all object bands (YES at step S36), the corrected multiband image creation unit 164 stores the created correction object band images in the storage unit 15 (step S37). Then, the corrected multiband image creation unit 164 ends the processing illustrated in FIG. 12.

Figure 14:
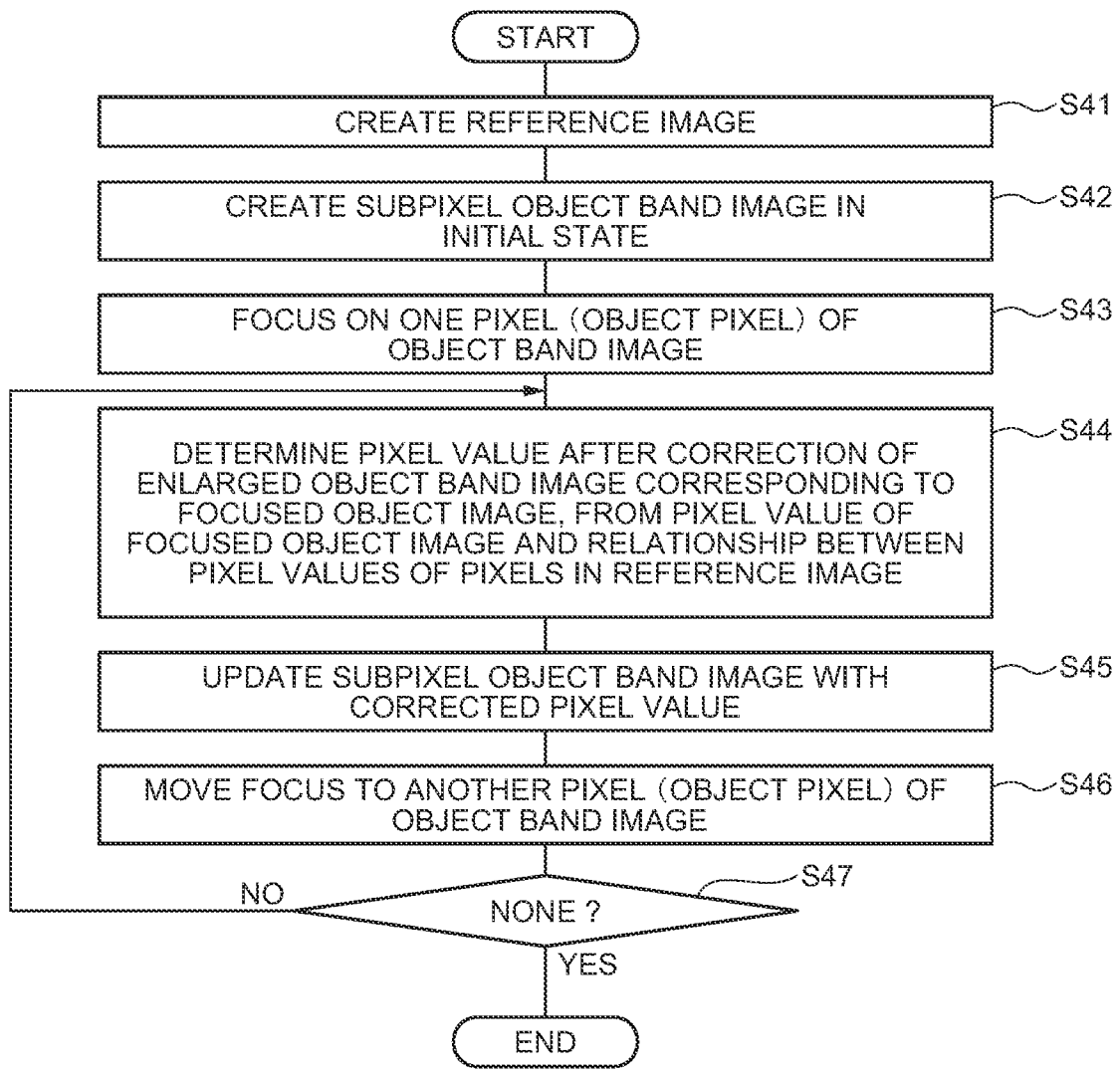
FIG. 14 is a flowchart illustrating a detail of processing of creating a subpixel object band image by the corrected multiband image creation unit in the image correction device according to the first exemplary embodiment of the present invention.

FIG. 14 is a flowchart illustrating the details of step S33 of FIG. 13, that is, exemplary processing of creating a subpixel object band image. Referring to FIG. 14, the corrected multiband image creation unit 164 first converts the enlarged high-resolution image so as to overlap the enlarged object band image to thereby create a reference image (step S41). For example, when the object band is an R band, the corrected multiband image creation unit 164 estimates affine transformation (A, b) (A represents a matrix, b represents a vector) to superimpose the enlarged R band image on the enlarged high-resolution image, and applies inverse transformation of the obtained affine transformation (A, b) to the enlarged high-resolution image to thereby create a reference image. Note that since a pixel position after the affine transformation is not an integer generally, interpolation processing is performed to obtain it.

Then, the corrected multiband image creation unit 164 creates a subpixel object band image in an initial state (step S42). The subpixel object band image in an initial state has a pixel corresponding to the pixel of an enlarged band image of the focused object band one by one, which is a pixel in which the pixel value of the original one pixel is set to all pixels (in this example, 64 pieces of pixels) after the enlargement corresponding to one pixel of the object band image before the enlargement.

Then, the corrected multiband image creation unit 164 focuses on one pixel (referred to as an object pixel) of the object band image (step S43). Then, from the pixel value of the focused object pixel and the relationship between the pixel values of the pixels of the 64 pieces of pixels of the reference image corresponding to the 64 pieces of pixels of the enlarged object band image corresponding to the focused object pixel, the corrected multiband image creation unit 164 determines the pixel values after correction of the pixel values of the 64 pieces of pixels of the enlarged object band image corresponding to the focused object pixel (step S44). For example, when (i, j) represents the object pixel, R(i, j) represents the pixel value of the object pixel (i, j), (u, v) (u, v=1, 2, . . . 8) represents the 64 pieces of pixels of the enlarged object band image corresponding to the object pixel (i, j), P(i, j, u, v) represents the pixel value of the 64 pieces of pixels of the reference image corresponding to the 64 pieces of pixels of the enlarged object band image corresponding to the object pixel (i, j), and R'(i, j, u, v) represents the pixel value after correction, the corrected multiband image creation unit 164 calculates the pixel value R'(i, j, u, v) after correction by using Expression 1 shown in FIG. 17. However, in Expression 1, <P(i, j, u, v)> represents an average value of the pixel values of the 64 pieces of pixels of the reference image corresponding to the 64 pieces of pixels of the enlarged object band image corresponding to the object pixel (i, j).

The average value of the pixel values R'(i, j, u, v) after the correction, calculated according to Expression 1, is the same as the pixel value R(i, j) of the object pixel (i, j). Further, allocation of the pixel values R'(i, j, u, v) after the correction, calculated according to Expression 1, becomes the same as the pixel values P(i, j, u, v) of the 64 pieces of pixel of the reference image corresponding to the 64 pieces of pixels of the enlarged object band image corresponding to the object pixel (i, j). In Expression 1, a difference between pixel values is used as a relationship between the pixel values. However, it is also possible to determine the pixel values after the correction of the pixel values of the 64 pieces of the enlarged object band image corresponding to the focused object pixel by using a ratio as a relationship between the pixel values.

Then, the corrected multiband image creation unit 164 updates the pixel value of the subpixel object band image with the determined pixel value after the correction (step S45). Then, the corrected multiband image creation unit 164 moves the focus to another pixel (object pixel) of the object band image (step S46), returns to step S44 through step S47 to repeat processing similar to the processing described above. Then, upon completion of focusing on all pixels of the object band image (YES at step S47), the corrected multiband image creation unit 164 ends the processing illustrated in FIG. 14.

Figure 15:
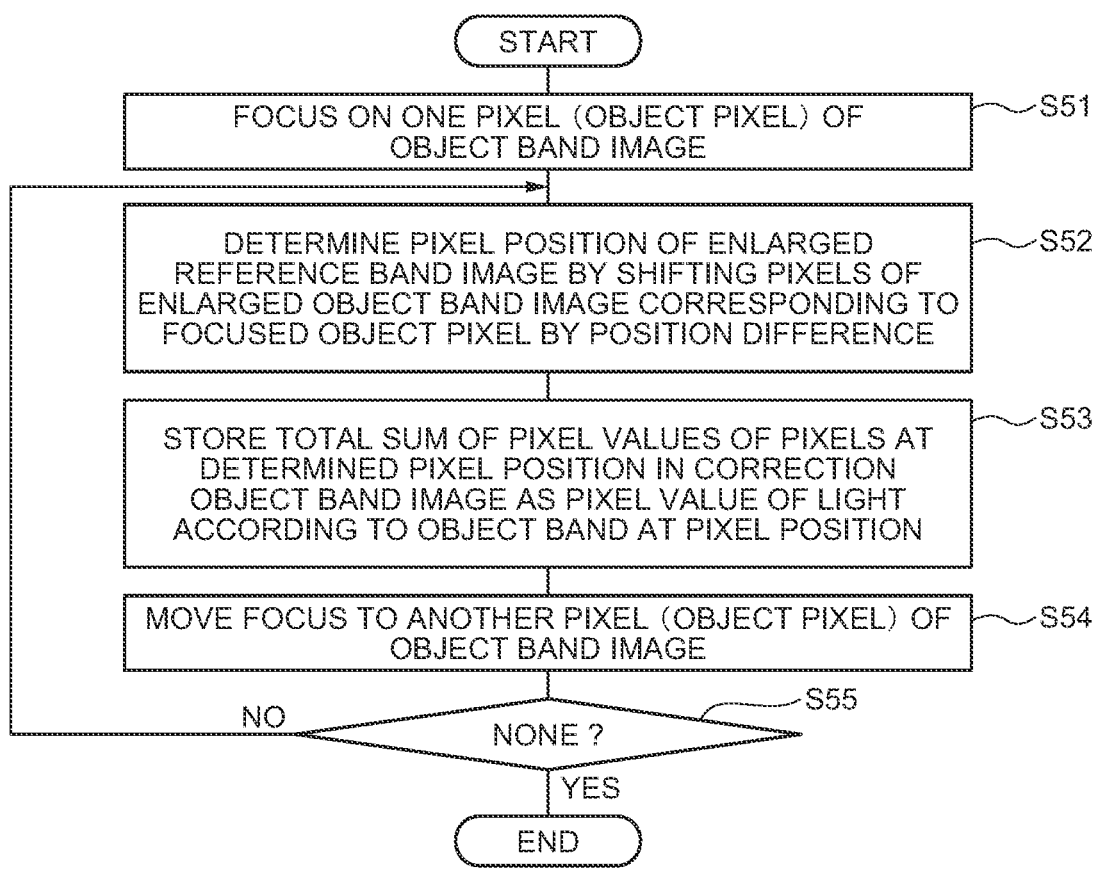
FIG. 15 is a flowchart illustrating a detail of processing of creating a correction object band image from a subpixel object band image and position difference information by a corrected multiband image creation unit in the image correction device according to the first exemplary embodiment of the present invention.
Figure 16:
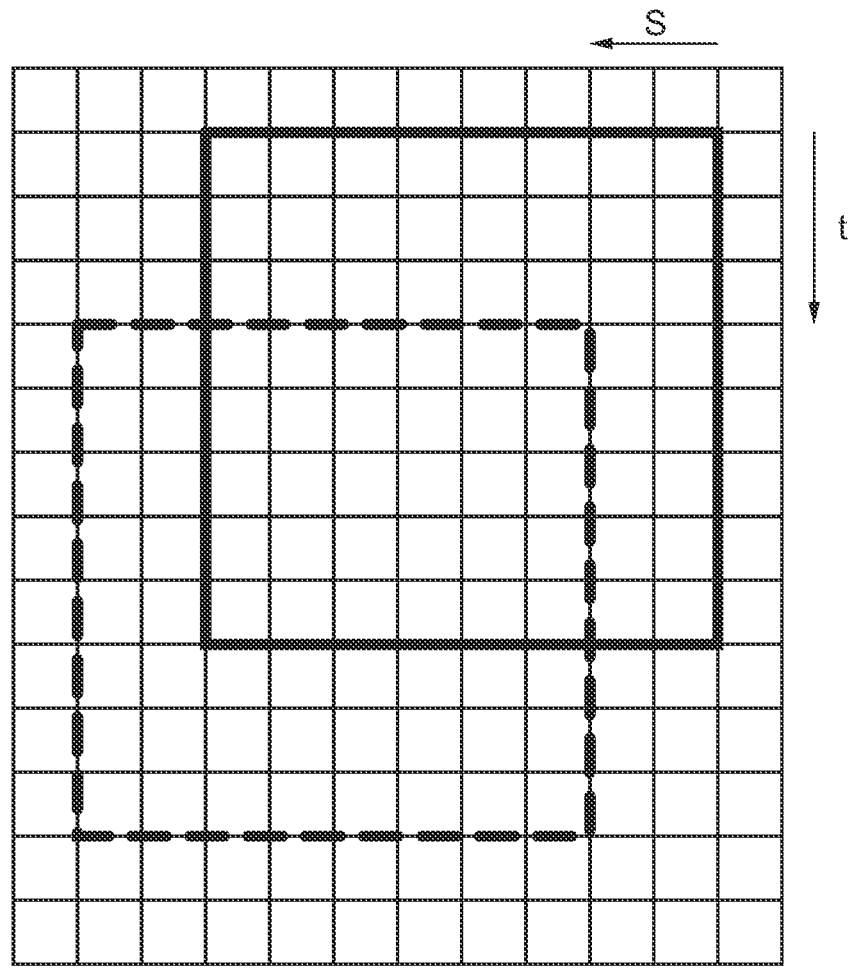
FIG. 16 is a schematic diagram illustrating a state of determining a pixel position of an enlarged reference band image from a subpixel object band image and position difference information by a corrected multiband image creation unit in the image correction device according to the first exemplary embodiment of the present invention.

FIG. 15 is a flowchart illustrating the details of step S34 of FIG. 13, that is, exemplary processing of creating a correction object band image from a subpixel object band image and position difference information. Referring to FIG. 15, the corrected multiband image creation unit 164 first focuses on one pixel (object pixel) of the focused object band image (step S51). Then, the corrected multiband image creation unit 164 determines the pixel position of an enlarged reference band image by shifting the 64 pieces of pixels of the enlargement object band image corresponding to the focused object pixel by the position difference of the object pixel (step S52). Here, in the present example, shifting is performed with a ⅛ pixel being a minimum unit. Therefore, when the position difference is not an integral multiple of ⅛ pixel, shifting is performed after correcting the difference to the closest integral multiple of ⅛ pixel. For example, when the 64 pieces of pixels of the enlargement object band image corresponding to the focused object pixel are a pixel group within a bold solid line in FIG. 16 and the position difference (s, t) is (⅔ pixel, ⅜ pixel), the corrected multiband image creation unit 164 determines a pixel group within a broken line in FIG. 16 to be a pixel position of the enlargement reference band image.

Then, the corrected multiband image creation unit 164 calculates the total sum of the pixel values of the 64 pieces of pixels at the determined pixel position as a pixel value of light on the enlargement object band image at the determined pixel position, and stores in the correction object band image (step S53). Then, the corrected multiband image creation unit 164 moves the focus to another pixel (object pixel) of the object band image (step S54), and returns to step S52 through step S55 to repeat processing similar to the processing described above. Then, upon completion of focusing on all pixels of the object band image (YES at step S55), the corrected multiband image creation unit 164 ends the processing illustrated in FIG. 15.

As described above, the image correction device 10 according to the present embodiment first acquires a plurality of band images obtained by imaging a subject, and a high-resolution image obtained by imaging the subject and having higher resolution than that of the band images. Then, using at least one of the band images as a reference band image and at least one of the rest as an object band image, the image correction device 10 acquires a position difference between the object band image and the reference band image. Then, by using a pixel of the object band image as an object pixel, for each pixel, the image correction device 10 determines a pixel value of each of sub regions obtained by dividing the imaging region of the object pixel into a plurality of regions, on the basis of the pixel value of the object pixel and a relationship between pixel values of a plurality of pixels of the high-resolution image corresponding to the object pixel, and creates a corrected band image that holds a pixel value of light on the object band image at the pixel position of the reference band image from the determined pixel value of the sub region and the position difference. Thereby, the image correction device 10 of the present embodiment can reduce a color shift caused by a phase difference.

The configuration, operation, and effects of the image correction device 10 according to the first exemplary embodiment has been described above. Next, some modifications of the first exemplary embodiment will be described.

<Modification 1>

Figure 18:
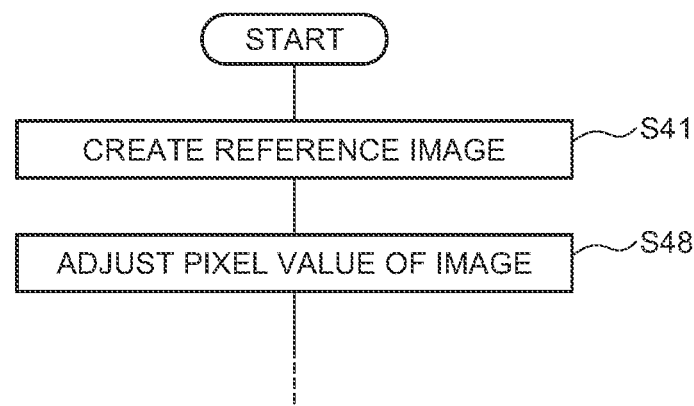
FIG. 18 is a flowchart illustrating another example of processing by a corrected multiband image creation unit.

In Modification 1, as illustrated in the flowchart of FIG. 18, the processing differs from that illustrated in FIG. 14 in that the corrected multiband image creation unit 164 is configured to further execute step S48 of adjusting the pixel value of an image.

The sensitivity or offset may differ between the multiband image to be processed and a reference image created from a high-resolution image (for example, panchromatic image). In that case, when a pixel value of each of the sub regions obtained by dividing the pixel region of the object pixel of the object band image into a plurality of regions is determined on the basis of the pixel value of the object pixel and the relationship between the pixel values of a plurality of pixels of the high-resolution image corresponding the object pixel, an error becomes large.

Therefore, in the case of using a difference between the pixel values as the relationship between the pixel values, the corrected multiband image creation unit 164 adjusts the pixel values of the reference image at step S48 by using Expression 2 shown in FIG. 17. Further, in the case of using a ratio of pixel values as the relationship between the pixel values, the corrected multiband image creation unit 164 adjusts the pixel values of the object band image and the reference image at step S48 by using Expressions 3 and 4 shown in FIG. 17. In Expressions 2, 3, and 4, $V_M(x, y)$ represents a pixel value of an object band image at a pixel $(x, y)$, $V_R(x, y)$ represents a pixel of a reference image created from a high-resolution image, $V_{RC}(x, y)$ represents a pixel value of the reference image after the adjustment, $V_{RC}(x, y)$ represents a pixel value of the object band image after the adjustment, $V_R(x, y)$ with an overline represents an average of $V_R(x, y)$, $\sigma(V_M(x, y))$ and $\sigma(V_R(x, y))$ represent standard deviation of $V_M(x, y)$ and standard deviation of $V_R(x, y)$, respectively, and $\min V_M(i, j)$ and $\min V_R(i, j)$ represent minimum values of the object band image and the reference image, respectively.

<Modification 2>

In the example illustrated in FIG. 4, the position difference information 154 is recorded in a list of sets of pixel position and position difference of each pixel of the object band image. However, the recording method of the position difference information 154 is not limited to that described above. For example, the position difference information 154 may be recorded in such a manner that the object band image is divided into a plurality of sub regions consisting of a plurality of pixels having the same position difference, and the position difference information 154 is recorded as a list of sets of pixel position and position difference of each sub region. The shape of a sub region may be a rectangle for example. Further, the pixel position of a sub region may be a set of pixel positions of an upper left pixel and a lower right pixel if it is a rectangle. Further, if the position differences of all pixels of the object band image are almost the same, only one position difference may be recorded.

Moreover, the position difference information 154 may be recorded as a mathematical expression or a coefficient of a mathematical expression, instead of being recorded as numerical information. For example, when the position difference is caused by optical distortion, the position difference is determined by the positional relationship between the object band and the reference band on the focus surface or optical characteristics. Therefore, the position difference of each pixel can be expressed by an expression defined by optical characteristics using the pixel position as an argument. Accordingly, such an expression or a coefficient thereof may be recorded as the position difference information 154. The position difference of each pixel can be calculated from the aforementioned expression.

Further, the position difference acquisition unit 163 may, for each object band, calculate an approximate plane from the calculated position difference of each pixel position, and record an expression representing the calculated approximate plane or a coefficient thereof as the position difference information 154. For example, when each pixel of the object band is three-dimensional point group data consisting of three-dimensional data $(x, y, (s, t))$ of a position difference $(s, t)$ of the pixel position x and the pixel position y for example, the approximate plane may be a plane in which the sum of the square distance from the point group becomes minimum. For example, in the case of using a plane given by Expression 5 of FIG. 17 as an approximate plane, the position difference acquisition unit 163 calculates a matrix A and a vector b that fit best by using the calculated position difference of each pixel position, to thereby able to obtain an expression representing the position difference information 154 of all pixels. While a coefficient of Expression 5 is obtained by using the position difference of each pixel position of the object band in the above description, it is possible to obtain the matrix A and the vector b that fit best by using the position difference of a pixel at the center position of each sub region described with reference to FIG. 9.

<Modification 3>

In the above description, the multiband image 152 is an image of three bands namely RGB. However, the multiband image 152 may be one other than that. For example, the multiband image 152 may be a four band image having three bands, namely RGB, and a near-infrared band. As described above, the number of bands of the multiband image 152 is not limited, and any number of bands having any wavelength bands may be used.

<Modification 4>

In the above description, it is described that the position difference $(s, t)$ between the pixel $(x, y)$ of the object band and the pixel $(x, y)$ of the reference band at the same pixel position is 0 or larger and less than 1. However, the position difference $(s, t)$ may be less than 0 or 1 or larger. With respect to any position difference $(s, t)$, it is assumed that $s'=s-s0$, $t'=t-t0$ are established, where s0 represents a maximum integer not exceeding s, and t0 represents a maximum integer not exceeding t. Then, with respect to the pixel $(x, y)$ of the reference band, when $x'=x-s0$ and $y'=y-t0$, the position difference between the pixel $(x, y)$ of the object band and the pixel $(x', y')$ of the reference band becomes $(s', t')$ that is 0 or larger and less than 1. Therefore, by replacing the pixel $(x, y)$ of the reference band with the pixel $(x', y')$, and replacing the position difference $(s, t)$ with the position difference $(s', t')$, it is possible to obtain the pixel value of the corrected band image by the processing that is the same as the above-described processing.

Second Exemplary Embodiment

Figure 19:
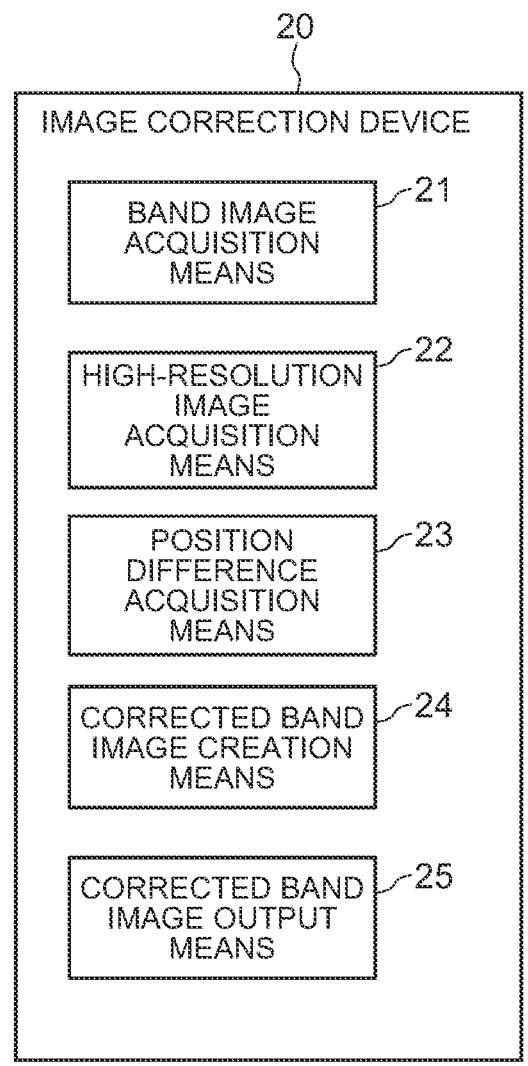
FIG. 19 is a block diagram illustrating an image correction device according to a second exemplary embodiment of the present invention.

FIG. 19 is a block diagram illustrating an image correction device 20 according to a second exemplary embodiment of the present invention. Referring to FIG. 19, the image correction device 20 is configured to include a band image acquisition means 21, a high-resolution image acquisition means 22, a position difference acquisition means 23, a corrected band image creation means 24, and a corrected band image output means 25.

The band image acquisition means 21 is configured to acquire a plurality of band images obtained by capturing a subject. The band image acquisition means 21 may be configured similarly to the multiband image acquisition unit 161 of FIG. 1 for example, but is not limited thereto.

The high-resolution image acquisition means 22 is configured to acquire a high-resolution image obtained by imaging the subject and having a higher resolution than that of the band image. The high-resolution image acquisition means 22 may be configured similarly to the high-resolution image acquisition unit 162 of FIG. 1 for example, but is not limited thereto.

The position difference acquisition means 23 is configured to, by using at least one of the band images as a reference band image and at least one of the rest as an object band image, acquire a position difference between the object band image and the reference band image. The position difference acquisition means 23 may be configured similarly to the position difference acquisition unit 163 of FIG. 1 for example, but is not limited thereto.

The corrected band image creation means 24 is configured to, by using a pixel of the object band image as an object pixel, for each object pixel, determine a pixel value of each of sub regions obtained by dividing imaging region of the object pixel into a plurality of regions, on the basis of the pixel value of the object pixel and the relationship between the pixel values of a plurality of pixels of the high-resolution image corresponding the object pixel. Further, the corrected band image creation means 24 is configured to create a corrected band image that holds a pixel value of light on the object band image at the pixel position of the reference band image, from the determined pixel value of each sub region and the position difference. The corrected band image creation means 24 may be configured similarly to the corrected multiband image creation unit 164 of FIG. 1 for example, but is not limited thereto.

The corrected band image output means 25 is configured to output the corrected band image. The corrected band image output means 25 may be configured similarly to the corrected multiband image output unit 165 of FIG. 1 for example, but is not limited thereto.

The image correction device 20 configured as described above operates as described below. First, the band image acquisition means 21 acquires a plurality of band images obtained by imaging a subject, and the high-resolution image acquisition means 22 acquires a high-resolution image obtained by imaging the subject and having higher resolution than that of the band images. Then, the position difference acquisition means 23 acquires, by using at least one of the band images as a reference band image and at least one of the rest as an object band image, a position difference between the object band image and the reference band image. Then, the corrected band image creation means 24 determines, by using a pixel of the object band image as an object pixel, for each object pixel, a pixel value of each of sub regions obtained by dividing the pixel region of the object pixel into a plurality of regions, on the basis of the pixel value of the object pixel and the relationship between the pixel values of a plurality of pixels of the high-resolution image corresponding the object pixel. Further, the corrected band image creation means 24 creates a corrected band image that holds a pixel value of light on the object band image at the pixel position of the reference band image, from the determined pixel value of each sub region and the position difference. Then, the corrected band image output means 25 outputs the corrected band image.

According to the image correction device 20 that is configured and operates as described above, it is possible to reduce a color shift caused by a phase difference. This is because the image correction device 20 acquires a plurality of band images obtained by imaging a subject and a high-resolution image obtained by imaging the subject and having a higher resolution than that of the band images, acquires, by using one of the band images as a reference band and using at least one of the rest as an object band image, a position difference between the object band image and the reference band image, and by using a pixel of the object band image as an object pixel, for each of the object pixel, determines a pixel value of each of sub regions obtained by dividing the imaging region of the object pixel into a plurality of regions, on the basis of the pixel value of the object pixel and the relationship between pixel values of the pixels of the high-resolution image corresponding to the object pixel, and creates a corrected band image that holds a pixel value of light on the object band image at the pixel position of the reference band image from the determined pixel value of each sub region and the position difference.

While the present invention has been described with reference to the exemplary embodiments described above, the present invention is not limited to the above-described embodiments. The form and details of the present invention can be changed within the scope of the present invention in various manners that can be understood by those skilled in the art.

INDUSTRIAL APPLICABILITY

The present invention can be used as an image correction device, an image correction method, and an image correction program that enable a multiband image (multispectral image) to be corrected to an image with no color shift. The present invention can also be used to correct a color shift caused in image geometric projection such as projection of an image obtained by imaging the ground from a satellite or an aircraft onto a map.

The whole or part of the exemplary embodiments disclosed above can be described as, but not limited to, the following supplementary notes.

(Supplementary Note 1)

An image correction device comprising:
  a band image acquisition means for acquiring a plurality of band images obtained by imaging a subject;
  a high-resolution image acquisition means for acquiring a high-resolution image obtained by imaging the subject, the high-resolution image having a resolution that is higher than a resolution of the band images;
  a position difference acquisition means for, by using at least one of the band images as a reference band image and at least one of rest of the band images as an object band image, acquiring a position difference between the object band image and the reference band image;

a corrected band image creation means for, by using a pixel of the object band image as an object pixel, for each object pixel, determining a pixel value of each of sub regions obtained by dividing the imaging region of the object pixel into a plurality of regions, on a basis of a pixel value of the object pixel and a relationship between pixel values of a plurality of pixels of the high-resolution image corresponding to the object pixel, and creating a corrected band image that holds a pixel value of light on the object band image at a pixel position of the reference band image from the determined pixel value of each of the sub regions and the position difference; and a corrected band image output means for outputting the corrected band image.

(Supplementary Note 2)

The image correction device according to supplementary note 1, wherein the corrected band image creation means determines the pixel position of the reference band image by shifting the object pixel by the position difference, and determines a total sum of the pixel values of the sub regions included in the determined pixel position to be the pixel value of light on the object band image at the determined pixel position.

(Supplementary Note 3)

The image correction device according to supplementary note 1 or 2, wherein as each of the sub regions obtained by dividing an imaging region of the object pixel of the object band image into a plurality of regions, the corrected band image creation means uses an imaging region of each pixel of an enlarged object band image obtained by enlarging the object band image so as to have a resolution that is same as the resolution of the high-resolution image.

(Supplementary Note 4)

The image correction device according to any of supplementary notes 1 to 3, wherein the corrected band image creation means uses a ratio of the pixel values as the relationship between the pixel values.

(Supplementary Note 5)

The image correction device according to any of supplementary notes 1 to 4, wherein the corrected band image creation means adjusts each pixel value of the high-resolution image by using a minimum pixel value of the high-resolution image.

(Supplementary Note 6)

The image correction device according to any of supplementary notes 1 to 5, wherein the corrected band image creation means uses a difference between the pixel values as the relationship between the pixel values.

(Supplementary Note 7)

The image correction device according to any of supplementary notes 1 to 6, wherein the corrected band image creation means adjusts each pixel value of the high-resolution image by using a standard deviation of the pixel value of the high-resolution image and a standard deviation of the pixel value of the object band image.

(Supplementary Note 8)

The image correction device according to any of supplementary notes 1 to 7, wherein the position difference acquisition means calculates the position difference according to an image correlation between the reference band image and the object band image.

(Supplementary Note 9)

The image correction device according to any of supplementary notes 1 to 8, wherein the position difference acquisition means divides the reference band image and the object band image into a plurality of small regions, and for each of the small regions, calculates a shift quantity with which the small region of the object band image most closely matches the small region of the reference band image as the position difference of all pixels of the small region of the object band image.

(Supplementary Note 10)

The image correction device according to any of supplementary notes 1 to 9, wherein the position difference acquisition means divides the reference band image and the object band image into a plurality of small regions, and for each of the small regions, calculates a shift quantity with which the small region of the object band image most closely matches the small region of the reference band image as the position difference of a pixel at a center position in the small region of the object band image, and calculates the position difference of a pixel other than the pixel at the center position by interpolation processing from the position difference of the pixel at the center position.

(Supplementary Note 11)

An image correction method comprising:

acquiring a plurality of band images obtained by imaging a subject;

acquiring a high-resolution image obtained by imaging the subject, the high-resolution image having a resolution that is higher than a resolution of the band images;

by using at least one of the band images as a reference band image and at least one of rest of the band images as an object band image, acquiring a position difference between the object band image and the reference band image;

by using a pixel of the object band image as an object pixel, for each object pixel, determining a pixel value of each of sub regions obtained by dividing the imaging region of the object pixel into a plurality of regions, on a basis of a pixel value of the object pixel and a relationship between pixel values of a plurality of pixels of the high-resolution image corresponding to the object pixel, and creating a corrected band image that holds a pixel value of light on the object band image at a pixel position of the reference band image from the determined pixel value of each of the sub regions and the position difference; and outputting the corrected band image.

(Supplementary Note 12)

The image correction method according to supplementary note 11, wherein the creating the corrected band image includes determining the pixel position of the reference band image by shifting the object pixel by the position difference, and determining a total sum of the pixel values of the sub regions included in the determined pixel position to be the pixel value of light on the object band image at the determined pixel position.

(Supplementary Note 13)

The image correction method according to supplementary note 11 or 12, wherein
the creating the corrected band image includes, as each of the sub regions obtained by dividing an imaging region of the object pixel of the object band image into a plurality of regions, using an imaging region of each pixel of an enlarged object band image obtained by enlarging the object band image so as to have a resolution that is same as the resolution of the high-resolution image.

(Supplementary Note 14)

The image correction method according to any of supplementary notes 11 to 13, wherein
in the creating the corrected band image, a ratio of the pixel values is used as the relationship between the pixel values.

(Supplementary Note 15)

The image correction method according to any of supplementary notes 11 to 14, wherein
the creating the corrected band image includes adjusting each pixel value of the high-resolution image by using a minimum pixel value of the high-resolution image.

(Supplementary Note 16)

The image correction method according to any of supplementary notes 11 to 15, wherein
in the creating the corrected band image, a difference between the pixel values is used as the relationship between the pixel values.

(Supplementary Note 17)

The image correction method according to any of supplementary notes 11 to 16, wherein
the creating the corrected band image includes adjusting each pixel value of the high-resolution image by using a standard deviation of the pixel value of the high-resolution image and a standard deviation of the pixel value of the object band image.

(Supplementary Note 18)

The image correction method according to any of supplementary notes 11 to 17, wherein
the acquiring the position difference includes calculating the position difference according to an image correlation between the reference band image and the object band image.

(Supplementary Note 19)

The image correction method according to any of supplementary notes 11 to 18, wherein
the acquiring the position difference includes dividing the reference band image and the object band image into a plurality of small regions, and for each of the small regions, calculating a shift quantity with which the small region of the object band image most closely matches the small region of the reference band image as the position difference of all pixels of the small region of the object band image.

(Supplementary Note 20)

The image correction method according to any of supplementary notes 11 to 19, wherein
the acquiring the position difference includes dividing the reference band image and the object band image into a plurality of small regions, and for each of the small regions, calculating a shift quantity with which the small region of the object band image most closely matches the small region of the reference band image as the position difference of a pixel at a center position in the small region of the object band image, and calculating the position difference of a pixel other than the pixel at the center position by interpolation processing from the position difference of the pixel at the center position.

(Supplementary Note 21)

A program for causing a computer to perform processing of:
acquiring a plurality of band images obtained by imaging a subject;
acquiring a high-resolution image obtained by imaging the subject, the high-resolution image having a resolution that is higher than a resolution of the band images;
by using at least one of the band images as a reference band image and at least one of rest of the band images as an object band image, acquiring a position difference between the object band image and the reference band image;
by using a pixel of the object band image as an object pixel, for each object pixel, determining a pixel value of each of sub regions obtained by dividing the imaging region of the object pixel into a plurality of regions, on a basis of a pixel value of the object pixel and a relationship between pixel values of a plurality of pixels of the high-resolution image corresponding to the object pixel, and creating a corrected band image that holds a pixel value of light on the object band image at a pixel position of the reference band image from the determined pixel value of each of the sub regions and the position difference; and
outputting the corrected band image.

REFERENCE SIGNS LIST 10 image correction device
11 one-dimensional array sensor
12 communication IN unit
13 operation input unit
14 screen display unit
15 storage unit
16 arithmetic processing unit
17 optical system
18 subject
18a blackboard
18b whiteboard
20 image correction device
21 band image acquisition means
22 high-resolution image acquisition means
23 position difference acquisition means
24 corrected band image creation means
25 corrected band image output means
151 program
152 multiband image
152-1 R-band image
152-2 G-band image
152-3 B-band image
153 high-resolution image
154 position difference information
154-1 position difference information
154-2 position difference information
154-3 position difference information
155 corrected multiband image
155-1 corrected R-band image
155-2 corrected G-band image
155-3 corrected B-band image
161 multiband image acquisition unit
162 high-resolution image acquisition unit
163 position difference acquisition unit
164 corrected multiband image creation unit 165 corrected multiband image output unit
1631 position difference information creation unit
1632 position difference information input unit

The invention claimed is:

1. An image correction device comprising:
a memory containing program instructions; and
a processor coupled to the memory, wherein the processor is configured to execute the program instructions to:
acquire a plurality of band images obtained by imaging a subject;
acquire a high-resolution image obtained by imaging the subject, the high-resolution image having a resolution that is higher than a resolution of the band images;
by using at least one of the band images as a reference band image and at least one other of the band images as an object band image, acquire a position difference between the object band image and the reference band image;
by respectively using one or more pixels of the object band image as one or more object pixels, for each object pixel, determine a pixel value of each of a plurality of sub regions obtained by dividing an imaging region of the object pixel, on a basis of a pixel value of the object pixel and a relationship between pixel values of a plurality of pixels of the high-resolution image corresponding to the object pixel, and create a corrected band image that has a pixel value of light on the object band image at a pixel position of the reference band image from the determined pixel value of each of the sub regions and the position difference; and
output the corrected band image, wherein
when creating the corrected band image, a ratio of the pixel values of the plurality of pixels of the high-resolution image corresponding to the object pixel is used as the relationship between the pixel values, and each pixel value of the high-resolution image is adjusted by using a minimum pixel value of the high-resolution image.

2. The image correction device according to claim 1, wherein
when creating the corrected band image, the pixel position of the reference band image is determined by shifting the object pixel by the position difference, and a total sum of the pixel values of the sub regions included in the determined pixel position is determined to be the pixel value of light on the object band image at the determined pixel position.

3. The image correction device according to claim 1, wherein
when creating the corrected band image, as each of the sub regions obtained by dividing an imaging region of the object pixel of the object band image into a plurality of regions, an imaging region of each pixel of an enlarged object band image is used that is obtained by enlarging the object band image so as to have a resolution that is same as the resolution of the high-resolution image.

4. An image correction device comprising:
a memory containing program instructions; and
a processor coupled to the memory, wherein the processor is configured to execute the program instructions to:
acquire a plurality of band images obtained by imaging a subject;
acquire a high-resolution image obtained by imaging the subject, the high-resolution image having a resolution that is higher than a resolution of the band images;
by using at least one of the band images as a reference band image and at least one other of the band images as an object band image, acquire a position difference between the object band image and the reference band image;
by respectively using one or more pixels of the object band image as one or more object pixels, for each object pixel, determine a pixel value of each of a plurality of sub regions obtained by dividing an imaging region of the object pixel, on a basis of a pixel value of the object pixel and a relationship between pixel values of a plurality of pixels of the high-resolution image corresponding to the object pixel, and create a corrected band image that has a pixel value of light on the object band image at a pixel position of the reference band image from the determined pixel value of each of the sub regions and the position difference; and
output the corrected band image, wherein
when creating the corrected band image, a difference between the pixel values of the plurality of pixels of the high-resolution image corresponding to the object pixel is used as the relationship between the pixel values.

5. The image correction device according to claim 4, wherein
when creating the corrected band image, each pixel value of the high-resolution image is adjusted by using a standard deviation of the pixel value of the high-resolution image and a standard deviation of the pixel value of the object band image.

6. The image correction device according to claim 1, wherein
when acquiring the position difference, the position difference is calculated according to an image correlation between the reference band image and the object band image.

7. The image correction device according to claim 1, wherein
when acquiring the position difference, the reference band image and the object band image are each divided into a plurality of regions, and for each of the regions, a shift quantity with which the region of the object band image most closely matches the region of the reference band image is calculated as the position difference of all pixels of the region of the object band image.

8. An image correction device comprising:
a memory containing program instructions; and
a processor coupled to the memory, wherein the processor is configured to execute the program instructions to:
acquire a plurality of band images obtained by imaging a subject;
acquire a high-resolution image obtained by imaging the subject, the high-resolution image having a resolution that is higher than a resolution of the band images;
by using at least one of the band images as a reference band image and at least one other of the band images as an object band image, acquire a position difference between the object band image and the reference band image;
by respectively using one or more pixels of the object band image as one or more object pixels, for each object pixel, determine a pixel value of each of a plurality of sub regions obtained by dividing an imaging region of the object pixel, on a basis of a pixel value of the object pixel and a relationship between pixel values of a plurality of pixels of the high-resolution image corresponding to the object pixel, and create a corrected band image that has a pixel value of light on the object band image at a pixel position of the reference band image from the determined pixel value of each of the sub regions and the position difference; and output the corrected band image, wherein when acquiring the position difference, the reference band image and the object band image are each divided into a plurality of regions, and for each of the regions, a shift quantity with which the region of the object band image most closely matches the region of the reference band image is calculated as the position difference of a pixel at a center position in the region of the object band image, and the position difference of a pixel other than the pixel at the center position is calculated by interpolation processing from the position difference of the pixel at the center position.

9. An image correction method comprising:

acquiring, by a processor, a plurality of band images obtained by imaging a subject;

acquiring, by the processor, a high-resolution image obtained by imaging the subject, the high-resolution image having a resolution that is higher than a resolution of the band images;

by using at least one of the band images as a reference band image and at least one of rest of the band images as an object band image, acquiring, by the processor, a position difference between the object band image and the reference band image;

by respectively using one or more pixels of the object band image as one or more object pixels, for each object pixel, determining, by the processor, a pixel value of each of a plurality of sub regions obtained by dividing an imaging region of the object pixel, on a basis of a pixel value of the object pixel and a relationship between pixel values of a plurality of pixels of the high-resolution image corresponding to the object pixel, and creating, by the processor, a corrected band image that has a pixel value of light on the object band image at a pixel position of the reference band image from the determined pixel value of each of the sub regions and the position difference; and outputting, by the processor, the corrected band image, wherein when creating the corrected band image, a ratio of the pixel values of the plurality of pixels of the high-resolution image corresponding to the object pixel is used as the relationship between the pixel values, and each pixel value of the high-resolution image is adjusted by using a minimum pixel value of the high-resolution image.

10. The image correction method according to claim 9, wherein when creating the corrected band image, the pixel position of the reference band image is determined by shifting the object pixel by the position difference, and a total sum of the pixel values of the sub regions included in the determined pixel position is determined to be the pixel value of light on the object band image at the determined pixel position.

11. The image correction method according to claim 9, wherein when creating the corrected band image includes, as each of the sub regions obtained by dividing an imaging region of the object pixel of the object band image into a plurality of regions, an imaging region of each pixel of an enlarged object band image is used that is obtained by enlarging the object band image so as to have a resolution that is same as the resolution of the high-resolution image.

12. An image correction method comprising:

acquiring, by a processor, a plurality of band images obtained by imaging a subject;

acquiring, by the processor, a high-resolution image obtained by imaging the subject, the high-resolution image having a resolution that is higher than a resolution of the band images;

by using at least one of the band images as a reference band image and at least one of rest of the band images as an object band image, acquiring, by the processor, a position difference between the object band image and the reference band image;

by respectively using one or more pixels of the object band image as one or more object pixels, for each object pixel, determining, by the processor, a pixel value of each of a plurality of sub regions obtained by dividing an imaging region of the object pixel, on a basis of a pixel value of the object pixel and a relationship between pixel values of a plurality of pixels of the high-resolution image corresponding to the object pixel, and creating, by the processor, a corrected band image that has a pixel value of light on the object band image at a pixel position of the reference band image from the determined pixel value of each of the sub regions and the position difference; and outputting, by the processor, the corrected band image, wherein when creating the corrected band image, a difference between the pixel values of the plurality of pixels of the high-resolution image corresponding to the object pixel is used as the relationship between the pixel values.

13. The image correction method according to claim 12, wherein when creating the corrected band image includes adjusting each pixel value of the high-resolution image is adjusted by using a standard deviation of the pixel value of the high-resolution image and a standard deviation of the pixel value of the object band image.

14. An image correction method comprising:

acquiring, by a processor, a plurality of band images obtained by imaging a subject;

acquiring, by the processor, a high-resolution image obtained by imaging the subject, the high-resolution image having a resolution that is higher than a resolution of the band images;

by using at least one of the band images as a reference band image and at least one of rest of the band images as an object band image, acquiring, by the processor, a position difference between the object band image and the reference band image;

by respectively using one or more pixels of the object band image as one or more object pixels, for each object pixel, determining, by the processor, a pixel value of each of a plurality of sub regions obtained by dividing an imaging region of the object pixel, on a basis of a pixel value of the object pixel and a relationship between pixel values of a plurality of pixels of the high-resolution image corresponding to the object pixel, and creating, by the processor, a corrected band image that has a pixel value of light on the object band image at a pixel position of the reference band image from the determined pixel value of each of the sub regions and the position difference; and outputting, by the processor, the corrected band image, wherein when acquiring the position difference, the reference band image and the object band image are each divided into a plurality of regions, and for each of the regions, calculating a shift quantity with which the region of the object band image most closely matches the region of the reference band image is calculated as the position difference of all pixels of the region of the object band image, and the position difference of a pixel other than the pixel at the center position is calculated by interpolation processing from the position difference of the pixel at the center position.

15. A non-transitory computer readable medium storing a program comprising instructions for causing a computer to perform processing of:

acquiring a plurality of band images obtained by imaging a subject;

acquiring a high-resolution image obtained by imaging the subject, the high-resolution image having a resolution that is higher than a resolution of the band images;

by using at least one of the band images as a reference band image and at least one of rest of the band images as an object band image, acquiring a position difference between the object band image and the reference band image;

by respectively using one or more pixels of the object band image as one or more object pixels, for each object pixel, determining a pixel value of each of a plurality of sub regions obtained by dividing an imaging region of the object pixel, on a basis of a pixel value of the object pixel and a relationship between pixel values of a plurality of pixels of the high-resolution image corresponding to the object pixel, and creating a corrected band image that holds has a pixel value of light on the object band image at a pixel position of the reference band image from the determined pixel value of each of the sub regions and the position difference; and outputting the corrected band image, wherein when creating the corrected band image, a difference between the pixel values of the plurality of pixels of the high-resolution image corresponding to the object pixel is used as the relationship between the pixel values.

\* \* \* \* \*